US007242925B2

(12) United States Patent
O'Neil et al.

(10) Patent No.: US 7,242,925 B2
(45) Date of Patent: Jul. 10, 2007

(54) WIRELESS MARKET PLACE FOR MULTIPLE ACCESS INTERNET PORTAL

(75) Inventors: Douglas R. O'Neil, Marietta, GA (US); Jose F. Rivera, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 329 days.

(21) Appl. No.: 10/431,830

(22) Filed: May 8, 2003

(65) Prior Publication Data

US 2004/0224693 A1 Nov. 11, 2004

(51) Int. Cl.
*H04M 3/42* (2006.01)
(52) U.S. Cl. .............. 455/414.1; 455/414.2; 455/414.3; 455/414.4; 455/445; 455/466; 709/217; 709/218; 709/219
(58) Field of Classification Search ............ 455/456.3, 455/414.1, 414.2, 414.3, 557, 556.1, 466, 455/426.1, 414.4, 456.1, 456.2, 456.4, 456.6, 455/445; 370/401, 402, 466, 467, 328, 352, 370/338; 709/228, 229, 218, 219, 217; 705/14
See application file for complete search history.

(56) References Cited

U.S. PATENT DOCUMENTS

| | | | | |
|---|---|---|---|---|
| 6,505,046 B1 * | 1/2003 | Baker | | 455/456.3 |
| 6,728,531 B1 * | 4/2004 | Lee et al. | | 455/419 |
| 6,757,530 B2 * | 6/2004 | Rouse et al. | | 455/412.1 |
| 6,856,809 B2 * | 2/2005 | Fostick | | 455/466 |
| 6,925,307 B1 * | 8/2005 | Mamdani et al. | | 455/466 |
| 7,088,995 B2 * | 8/2006 | Rao | | 455/418 |
| 7,092,370 B2 * | 8/2006 | Jiang et al. | | 370/329 |
| 2002/0077083 A1 * | 6/2002 | Zellner et al. | | 455/414 |
| 2003/0006911 A1 * | 1/2003 | Smith et al. | | 340/988 |
| 2003/0023726 A1 * | 1/2003 | Rice et al. | | 709/225 |
| 2003/0061303 A1 * | 3/2003 | Brown et al. | | 709/217 |
| 2003/0065768 A1 * | 4/2003 | Malik | | 709/224 |
| 2003/0096625 A1 * | 5/2003 | Lee et al. | | 455/466 |
| 2003/0186680 A1 * | 10/2003 | Bhasin et al. | | 455/411 |
| 2003/0195009 A1 * | 10/2003 | Endo | | 455/466 |
| 2003/0212759 A1 * | 11/2003 | Wu | | 709/218 |
| 2003/0233329 A1 * | 12/2003 | Laraki et al. | | 705/52 |
| 2004/0048604 A1 * | 3/2004 | Idei | | 455/414.1 |
| 2004/0198390 A1 * | 10/2004 | Kaise | | 455/456.1 |
| 2005/0183061 A1 * | 8/2005 | Papanikolaou et al. | | 717/103 |

* cited by examiner

*Primary Examiner*—Joseph Feild
*Assistant Examiner*—Olumide Ajibade-Akonai
(74) *Attorney, Agent, or Firm*—Thomas, Kayden, Horstemeyer & Risley, LLP

(57) ABSTRACT

Multiple access internet portals with wireless market place systems are provided. A representative system, among others, includes a wireless internet server and a wireless market place system. The wireless internet server routes internet content from a content provider to a plurality of platform gateways, while the wireless market place system receives a set of rules from a third party vendor, and translates the set of rules into a format operable to be routed by the wireless internet server. Methods and other systems for providing access to wireless customers are also provided.

20 Claims, 19 Drawing Sheets

WIRELESS MARKET PLACE FOR MULTIPLE ACCESS INTERNET PORTAL

FIELD OF THE INVENTION

The present invention is generally related to internet connectivity, and more particularly related to multiple access internet portals.

DESCRIPTION OF THE RELATED ART

The development of the internet has resulted in rapid technology growth over the past ten years. This is particularly true of the world-wide-web. As the world-wide-web has grown, it has become a part of everyday life for many. Web based e-mail has allowed people the convenience of accessing their accounts from any terminal equipped with a web browser. Moreover, companies such as Yahoo! and Microsoft have expanded to give users the flexibility of providing personalized content at any web terminal worldwide.

In the past few years, it has become increasingly prevalent to carry a wireless access protocol (WAP) enabled cellular phone. As WAP phones have become more popular, content providers like Microsoft have attempted to provide their services to the end user through licensing the wireless carrier to provide the service to their customers. However, these services often provide a disjointed experience between platforms, and lack an integrated solution for providing internet service to mobile customers. Thus, there is a need for systems that overcome the above shortcomings, among others.

SUMMARY OF THE INVENTION

One embodiment, among others, of the present invention provides a system for interfacing with a customer of a telecommunications carrier. A representative system, among others, includes a wireless internet server operable to route internet content from a content provider to a plurality of platform gateways. The system further includes a wireless market place system operable to translate a set of rules from a third party vendor into a format operable to be routed by the wireless internet server.

One embodiment of the present invention provides methods for providing access to a plurality of customers. A representative method, among others, can include the following steps: receiving a message from a third party vendor; formatting the message for delivery to a recipient; and, sending the message to at least one of the plurality of customers.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

The preferred embodiments of the present invention now will be described more fully with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1:
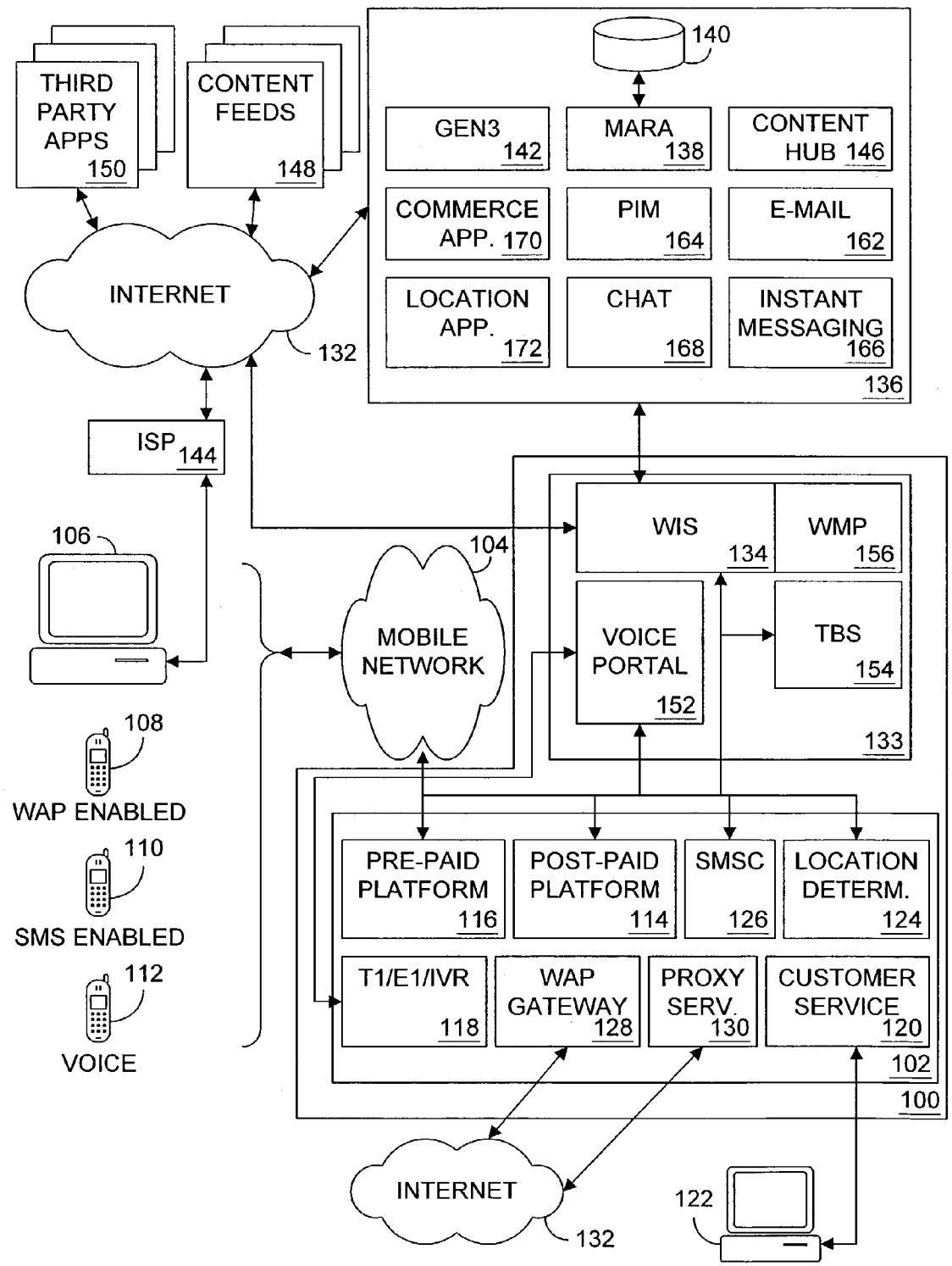
FIG. 1 is a block diagram of an embodiment, among others, of the present invention.

Referring now to FIG. 1, shown is a block diagram illustrating an embodiment, among others, of the present invention. The communication facilities 100, typically include existing equipment 102 that is operable to connect to a mobile network 104. The existing equipment 102 is typically operable to connect wireless devices 106, 108, 110, 112 from different wireless platforms to land line phones, the internet 132, or other wireless devices through the mobile network 104.

Typically, the existing equipment 102 includes a post-paid billing platform 114 which tracks per minute usage of the mobile network 104. At the end of each billing period (typically one month) the post-paid billing platform 114 is used to bill each customer based on the number of billable minutes he or she used. Most existing equipment 102 embodiments also contain a pre-paid billing platform 116 which allows customers to use the mobile network based upon the amount the customer has in his or her account. The pre-paid billing platform 116 then debits the account based upon the billable minutes used. Each system is also operable to determine the amount of minutes that can be billed to the customer and the rate at which the customer is billed. In the United States the billing relationship is typically a "mobile party pays" billing relationship (both parties paying if both are mobile). This means that virtually all mobile airtime used by a customer will be billed to the customer. However, in many foreign countries, the billing relationship is "calling party pays," which means that the post-paid billing platform cannot bill the receiver for minutes of calls received by a wireless device. Moreover, the carrier cannot bill the caller unless the call is connected, thus bringing about the prevalence of providing voice mail in order to connect the call. The billing platforms are typically embodied in software, and one such system that could be used is an APEX Billing System (ABS) available from APEX Voice Communications of Sherman Oaks, Calif. Moreover, the carrier can use these billing platforms to format the billing information to print statements to provide to its customers.

The existing equipment 102 can further include an IVR system 118. IVR systems are available from a plethora of vendors, including Lucent Technologies of Murray Hill, N.J. and Alcatel of Paris, France. The IVR system 118 can facilitate interaction between a customer and a customer service unit 120 in the existing equipment 102. The customer service unit 120 is typically a software solution that can collect responses from the customer through the IVR and communicate these responses to a customer service representative via a computer 122. The interactive voice response system is typically rated to provide 24 voice channels (T1) in the United States, and is typically rated to provide 30 voice channels (E1) overseas. The IVR system provides prompts and receives responses from the user in order to gather information from the user to supply to a customer service representative via the customer service unit 120 and computer 122. The customer service representative can then interact with the customer and his or her account by changing settings, adding features, removing features, etc. One skilled in the art will recognize that the customer service unit 122 can also make limited changes.

The existing equipment 102 typically also includes a location determination system 124 for wireless devices 106, 108, 110, 112. The location determination system 124 is typically a home location register (HLR) database that keeps track of where all wireless devices 106, 108, 110, 112 are at any time, such that an incoming call can be routed to the cellular tower providing the strongest signal to the wireless device 106, 108, 110, 112. The location determination system can keep track of a wireless device by using GPS, or through a cell-ID associated with the phone as it is tracked through various cells. Typically a wireless device 106, 108, 110, 112 sends a beacon signal to alert a cellular tower (usually a nearest cellular tower) that the device 106, 108, 110, 112 is in the cell served by that tower. The cellular tower, in turn, notifies the location determination system 124 of the fact that the wireless device 106, 108, 110, 112 is in the cell corresponding to that cellular tower. Moreover, the location determination system 124 is operable to determine which signal is stronger, if the wireless device 106, 108, 110, 112 is at the edge of a cell. From this information, the location determination system 124 can determine approximately where the wireless device 106, 108, 110, 112 is located.

The increasing popularity of text messaging means that most existing equipment 102 embodiments also includes a short message service center 126. The short message service center (SMSC) 126 is operable to receive a short message from a short message service enabled wireless device 110 and route the short message to the desired short message service enabled recipient. Typically the SMSC will query a home location register (HLR) using the mobile identification number to determine the mobile switching center (MSC) the destination with which the wireless device is currently associated. The SMSC will then send the message to the MSC an SMS delivery request. If the wireless device is available, the MSC delivers the message and sends a delivery acknowledgement to the SMSC. Otherwise, the SMSC stores the message until notified by the MSC that the wireless device is available. An example of such an SMSC is MiLife Short Message Service Center available from Lucent Technologies.

Another feature that most existing equipment 102 embodiments include is a WAP gateway 128. The WAP gateway 128 allows a WAP enabled wireless device 108 to download web pages from a content provider using a wireless markup language (WML) via the internet 132. The WML can be interpreted by a browser included in a WAP enabled device 108 and displayed on the screen. Typically these WAP enabled devices 108 such as a phone, personal digital assistant (PDA), etc. can only access websites that are designed for use with WAP browsers. As such only a relatively few content providers have designed websites specifically for WAP enabled browsers. The WAP gateway 128 is typically a server and is available from a plethora of vendors, including Ericsson of Stockholm, Sweden and Nokia of Helsinki, Finland.

Many phone carriers also double as internet service providers, which can include high-speed wireless connection for a computer 106. Thus, the existing equipment 102 also typically includes a proxy server 130 to allow the computer 106 to connect to the internet 132. The proxy server 130 is operable to route hypertext markup language (HTML) to a computer 108 with a high-speed wireless internet connection, and serves as a gateway between the mobile network 104 and the internet 132.

In an embodiment of the present invention, the communication facilities 100 can also include a multiple access internet portal 133 including a wireless internet server (WIS) 134 which is operable to provide internet service to a variety of different wireless platforms. In particular, the WIS 134 is operable to receive a request from any of the wireless devices 106, 108, 110, 112 for internet content. In one embodiment, among others, of the present invention, the WIS 134 is based on two servers (and input server and a processing server), and is a component-based distributed processing system designed to interface with the carrier's existing short message service centers, wireless access protocol gateways, proxy servers, voice portals, back office systems, and the content provider. The input server in one embodiment, among others, is a ProLiant ML370, while the processing server is a ProLiant DL580, both available from Hewlett-Packard Company of Palo Alto, Calif. Typically, specific software modules can add functionality to interface with specific systems or specific services.

Upon receiving a request for internet content, in one embodiment, among others, of the present invention, the WIS 134 can request authentication from the wireless device attempting to access the internet content. Because the mobile network 104 receives a mobile identification number (MIN) associated with the wireless device 106, 108, 110, 112, the WIS 134, in some embodiments, can receive the MIN from the mobile network 104 and authenticate a wireless device by asking only for the password associated with the received MIN. The WIS 134 then passes the password along to a centralized authentication system, which includes the mobile authentication registration application (MARA) 138 and a user database 140. The user database 140 typically includes the MINs for all registered customers, and a password associated with each MIN. The MARA is typically embodied in software on a server located at the content provider.

The user database 140 can also typically include a number of fields related to the user. These fields can include the MIN and password as indicated above. The database 140 can further include a key question and answer that allows a user to access his or her account in the event of a lost or forgotten password. The database 140 can also include the e-mail address for the user, such that the content provider will access the correct e-mail account. The database 140 can also include all or some of the following: full name, home city, birth date, gender, marital status, educational level, occupation, income, phone make and model, wired phone number, home address, interests, and promotional advertising preferences.

In one embodiment, among others, the registration process for a customer takes place over the phone with a customer service representative on computer 122. The customer service representative can use a computer 122 to register a customer to use the WIS 134 by adding the user to the WIS 134 database, which is then uploaded to the MARA 138. The customer service representative would typically ask the user for at least a portion of the information stored in the database 140. Moreover, the customer service representative can also provision the user for various applications over the wireless portal. Thus, if the user does not wish to have access to WAP content, the user could alert the customer service representative to not provision the service for WAP. In alternative embodiments, among others, the customer could provision himself or herself with the system via a computer connected to the internet 106, a WAP enabled phone 108, an SMS enabled phone 110 or via voice through the IVR 118.

In one embodiment, among others, of the present invention, the MARA 138 is used to provide a single point log-on to the content provider. The WIS 134 can translate authentication requests into extensible markup language (XML) such that the authentication request will be recognized by the MARA 138. This enables a subscriber to access a variety of applications and databases with only one username and password combination. Each subscriber can enter his or her username and password in the multiple access internet portal 133 only once per session. The MARA 138 then checks all applications under the subscriber's personalized profile, and allows them to access all personal information (e-mail, instant messaging, personal information manager, etc.) in a secure mode, without having to sign in again with a different username and password.

Using the MARA 138 as a single point log-on provides centralized portal management. Centralized portal management allows centralized user administration control that extends across multiple web-based applications, frees the carrier from developing a complex security, privilege, and personalization technology for each application. The MARA 138 also provides a better experience to the user. The better experience will encourage the user to continue using the system. Moreover, the single log-on can provide the user with access to personalized information.

After receiving authentication, the MARA 138 will pull a profile associated with the customer from the database 140 and provide the profile to a GEN3 system 142 (described below). This profile can contain a plethora of personalized information associated with the customer. From this information, the GEN3 system 142 can construct a front-page for the-user based also upon the platform the customer is using to access the WIS 134. The type of platform being used by the user can be determined by examining the requests received via the WIS 134, or other access device and sent to the content provider 136. This front-page can be similar to a Yahoo! or MSN personalized front-page, in that it can contain personalized news content, business content, weather, travel, sports, etc. Moreover, in one embodiment, among others, of the present invention, substantially similar personalized content can be accessed across each of the platforms connecting to the wireless internet server, and via an ISP 144 not part of the communication facilities 100. One skilled in the art will recognize that each wireless device platform is different, and thus cannot display the same personalized content that each of the other platforms can display. However, the information that is presented and a general format can be followed to make the user's experience relatively seamless across platforms. For example, among others, if a user wants to receive sports and business news, but no political news or weather information, such preferences could be followed in all platforms. In an alternative embodiment of the present invention, the user can personalize his or her experience on each of the platforms independently, such that the information received at each platform is not substantially similar.

In particular, the GEN3 system 142 is operable to receive content from the content hub 146, content feeds 148 and third party applications 150, among others. The GEN3 system 142 then collects this content based upon a profile received from the MARA 138, and translates the content into the particular language used by the platform attempting to access the information. The content is then provided to the WIS 134, the WAP gateway 128 or the proxy server 130 as requested. Typically, the GEN3 is embodied in software run by a server.

The content hub 146 is typically an XML based content engine designed to acquire and distribute massive amounts of content data to multiple devices. The content hub 146 provides a system for content acquisition from various news feeds and other data sources, and it also has the capability of sending data back to various entities provided that XML data schemes exist between the two entities.

The wireless carrier benefits from a safer data traffic environment, and the centralized system frees wireless carriers to focus on their business logic instead of developing or worrying about content integration. Without this centralized, shared approach, the portal quickly becomes significantly more complex as applications are added and content management becomes overwhelming. The content hub 146 can further provide a content editorial tool. This application can allow the content provider 136 the ability to quickly add, change and delete articles from the content hub 146, define new categories, add text, and create new stories.

Typically, SMS and voice content would be sent to the WIS 134, while WML and HTML would be sent to the WAP gateway 128 and proxy server 130, respectively. This setup is intended to relieve potential congestion at the WIS 134, however, one skilled in the art should recognize that each type of data could be routed through the WIS 134. In turn, the WIS 134, WAP gateway 128 and proxy server 130 devices send the information to the wireless device requesting the content. Moreover, the GEN3 142 is operable to provide access to each of the applications residing on the content provider 136.

In some embodiments, among others, the WIS 134 is operable to retrieve the personalized profile associated with the user from the MARA 138. The WIS 134 can then retrieve internet content from the content provider 136, and provide periodic updates via SMS to a wireless device 110 throughout the day. Thus, internet content can be pushed to the customer according to prior configuration.

With respect to routing of voice calls to the WIS 134, a voice portal 152 is added to the multiple access internet portal 133 to handle voice traffic from the internet. In one embodiment, among others, the voice portal 152 is equipped with a text to speech feature that allows a customer to receive information from text sources, which are converted to speech for the customer. The WIS 134 routes most voice content, however, to reduce traffic, the voice portal 152 can connect directly to the internet to receive e-mail content. It should be noted that the WIS 134 could also be configured to route all traffic. In one embodiment, among others, usage time can be tracked to determine how much to bill the customer for his or her use of the voice portal 152.

The voice portal typically includes a plurality of hardware and software. For example, among many others, a single E1 system directly connected to the public switched telephone network (PSTN) can include an SS7 Signaling Server, a single E1 interface Voice Portal Platform Server, a Nuance Speech Recognition and TTS server located on a Compaq ProLiant DL360 server, a web server on an Compaq ML370 server, and an Oracle database server, available from Oracle Corp. of Redwood City, Calif. The Nuance Voice Speech Recognition and TTS server is a software application available from Nuance of Menlo Park, Calif. One skilled in the art will recognize that there are a plethora of different vendors who can supply an entire voice portal or various pieces of the voice portal.

With respect to internet content via the short message service, the WIS 134 is typically configured to handle all short messaging of internet content to a wireless device 110. The WIS 134 can receive a content request from a wireless device 110 via the short message service center 126. Upon receiving the content request from the wireless device 110, the WIS 134 can authenticate a user associated with the wireless device 110 by prompting the user for a password and sending the password to the MARA 138. The MARA 138 then instructs the GEN3 142 to send the personalized content for the user to the WIS 134. The GEN3 142 then retrieves the personalized content from the content hub 146 and sends the personalized content to the WIS 134. The WIS 134 is operable to store the personalized content and transmit the personalized content to the wireless device 110 via the short message service. Because of the short message service format, the WIS 134 typically provides the user with a summary of the personalized content available, and stores details of the personalized content until a request for detailed content is received. Thus, the user is able to navigate through his or her personalized content efficiently.

The multiple access internet portal 133 can also include a transaction billing system (TBS) 154. The TBS 154 can be used to receive CDRs from the WIS 134, and format the CDRs according to the format specified by the particular billing platform used. The TBS 154 can format the record to either debit a pre-paid account on the pre-paid billing platform 116, or charge to a customer account on the post-paid billing platform 114.

Moreover, the TBS 154, in one embodiment, among others, of the present invention can be used to bill different customers differently based upon the service,to which the customer has subscribed. Furthermore, the TBS 154 can be used to charge customers differently based upon the content accessed through the WIS 134. For example, if a customer wishes to receive real-time stock updates, he or she could pay a premium. However, if the customer chooses to receive stock quotes that are not real time, the TBS 154 could charge the customer based upon normal or even a discount rate.

It should be recognized by one skilled in the art, that a customer may be allowed to use the system without being registered. In this instance, the MARA 138 will not recognize the user as a registered user, but can allow the user to access public information from the content provider 136. The WIS 134 will determine whether the customer is a pre-paid or post-paid customer. If the customer is a pre-paid customer, the WIS 134 will determine whether enough money remains on the customer's account on the pre-paid platform 116 prior to allowing the customer to access the service. If the customer is a post-paid customer, the WIS 134 will allow the customer to use the public portion provided by the content provider 136 and bill the customer via the post-paid billing platform 114. In each instance where the customer is allowed to access internet content, the WIS 134 will keep a CDR, and alert the TBS 154 of the customer's usage. The TBS 152 will, in turn, format the data received from the WIS 134 such that it correctly charges the customer account, and is readable by the corresponding billing platform 114, 116.

Moreover, it should be recognized that in the case of a pre-paid customer, that the WIS 134 and TBS 154 will debit the customer's account on the pre-paid platform 116 incrementally until the customer exits the system, or runs out of money in the pre-paid account. Upon running out of money in the account, the WIS 134 can refuse access to the customer. Alternatively, the TBS 154 could prompt the post-paid billing platform 114 to begin a billing record for the pre-paid customer upon the pre-paid account funds being exhausted.

Figure 2:
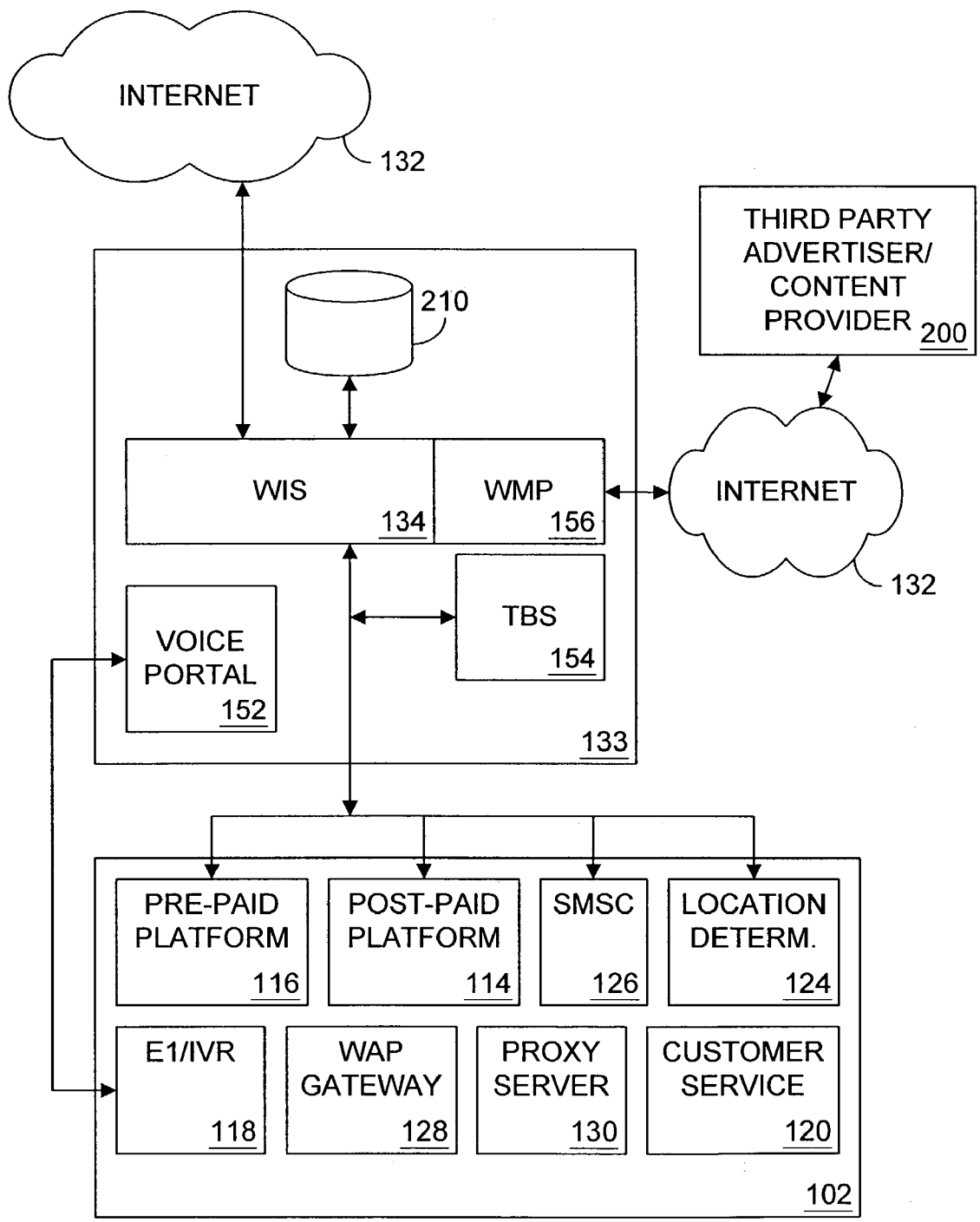
FIG. 2 is a block diagram of an embodiment, among others, of the present invention.

Referring now to FIG. 2, shown is an embodiment, among others, of the present invention, in which the multiple access internet portal 133 of the communication facilities 100 includes a wireless market place (WMP) system 156. The WMP 156 allows third party content providers or advertisers 200 to send a message with certain information to the multiple access internet portal 133 and have the messages provided to the wireless devices 106, 108, 110, 112 without necessitating that the third party content provider or advertiser invest in the equipment necessary to format the message to a standard used by the multiple access internet portal 133. Such interfacing equipment can be costly and inefficient to own for most third party content providers and advertisers 200. The WMP 156, in particular, will provide a port connected to the internet which will receive a set of rules from the third party vendor, according to the carrier's security standards, and the protocol for connecting to the port will be an industry standard. The rules could include, among others: the vendor's name, a message from the vendor, the types of customers (SMS, WAP, voice, web, etc.) to which the vendor would like the message routed, a specific list of customers to whom the message is to be routed, etc.

In an embodiment, among others, of the present invention, the WIS 134 can 5 store a personalized profile associated with a user, and can refuse a third party content provider or advertiser 200 request to send content to a customer. In this embodiment, the customer could set his or her profile to reject third party content. Thus, upon authenticating him or herself, the WIS 134 could receive the profile associated with the customer. Then, when the WIS 134 receives content from a third party content provider of advertiser 200, the WIS 134 checks the profile to determine whether the customer's account is enabled to receive the content. If the customer's account is enabled, the message is sent via the appropriate gateway. Otherwise, the message is rejected by the WIS 134 and discarded.

One skilled in the art should recognize that the TBS 154 could also be configured to store usage information and provide periodic detailed reports outlining the level of usage of the multiple access internet portal 133. These reports can be used by the carrier to determine the level of bandwidth needed to support the multiple access internet portal 133 and whether it is cost effective to provide the multiple access internet portal 133 to the customers of the carrier.

Moreover, the content provider 136 can be given access to the periodic detailed reports which can show the number of calls received, call detail records (CDRs) for each call, the revenue generated, etc., from the TBS 154, in order to facilitate a revenue sharing plan with the content provider. The revenue sharing plan would typically entail the carrier collecting the revenues from each of its customers who have subscribed to and/or used the service. Because the carrier is providing the customer relationship and most of the dedicated equipment, the carrier could typically demand a higher percentage of such proceeds than the content provider in a revenue sharing plan. Such a revenue sharing plan would allow the carriers to efficiently provide internet service and content to their customers. To provide this internet service, the carrier 136 would merely invest in the multiple access internet portal 133 equipment and let the content provider 136 create content for the multiple access internet portal 133. Under the plan, the content provider 133 could continue to operate a standard multiple access internet portal for standard internet users connecting via an ISP 144, while creating new content to provide to the carrier's customers. Thus, the content provider could be assured of having an audience among the carrier's customer base, and the carrier would not be required to create content or license content from a content provider without a means to accurately charge its customers.

Referring back to FIG. 1, the content provider can also include a number of centralized applications that can be made available to the user. These applications can include, among many others: an email application 162, a personal information manager (PIM) 164, an instant messaging application 166, a chat application 168, a commerce application 170 and a location application 172.

Figure 3A:
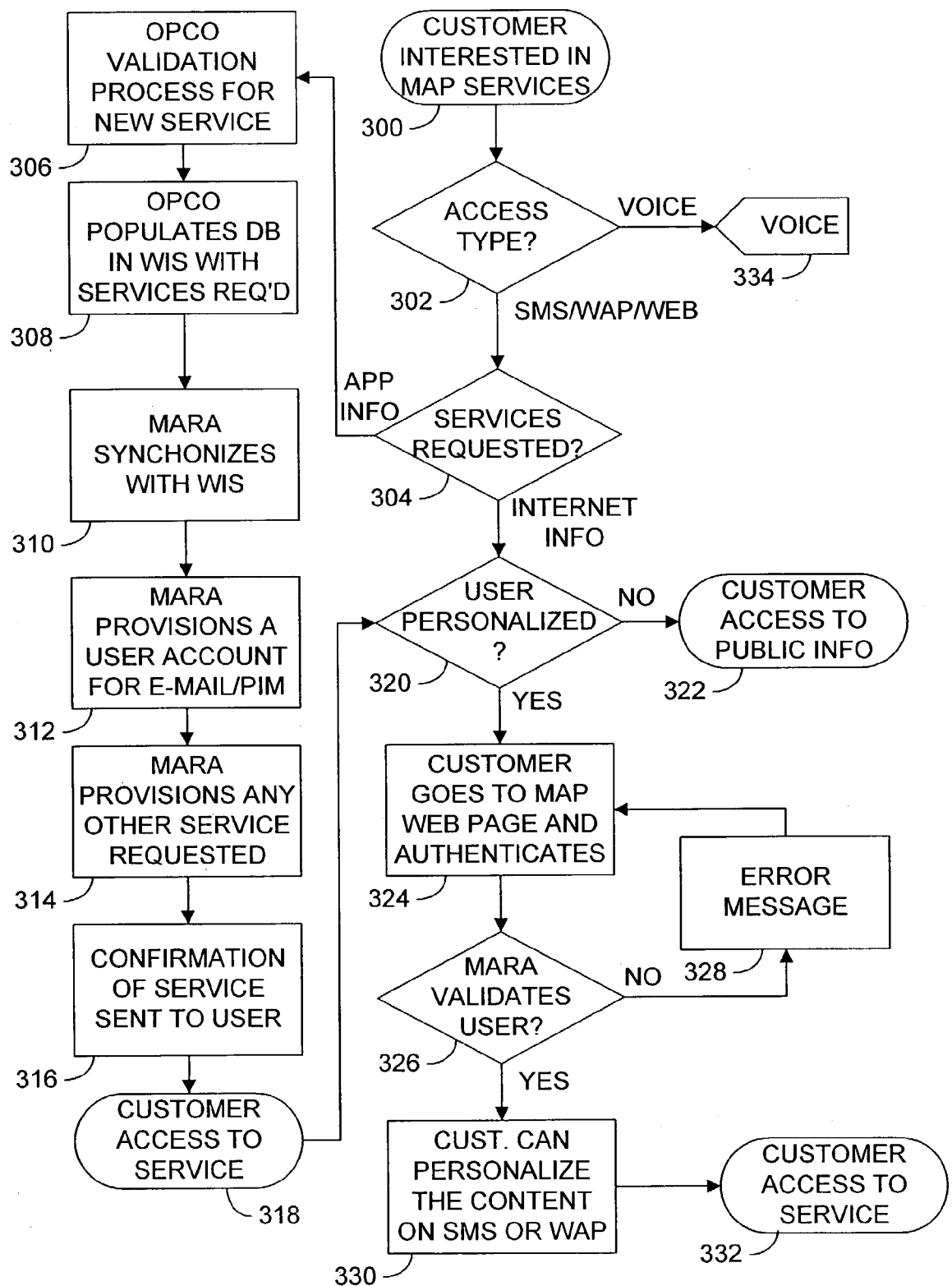
FIG. 3A is an embodiment, among others, of a flowchart of a method used by the system of FIG. 1.
Figure 3B:
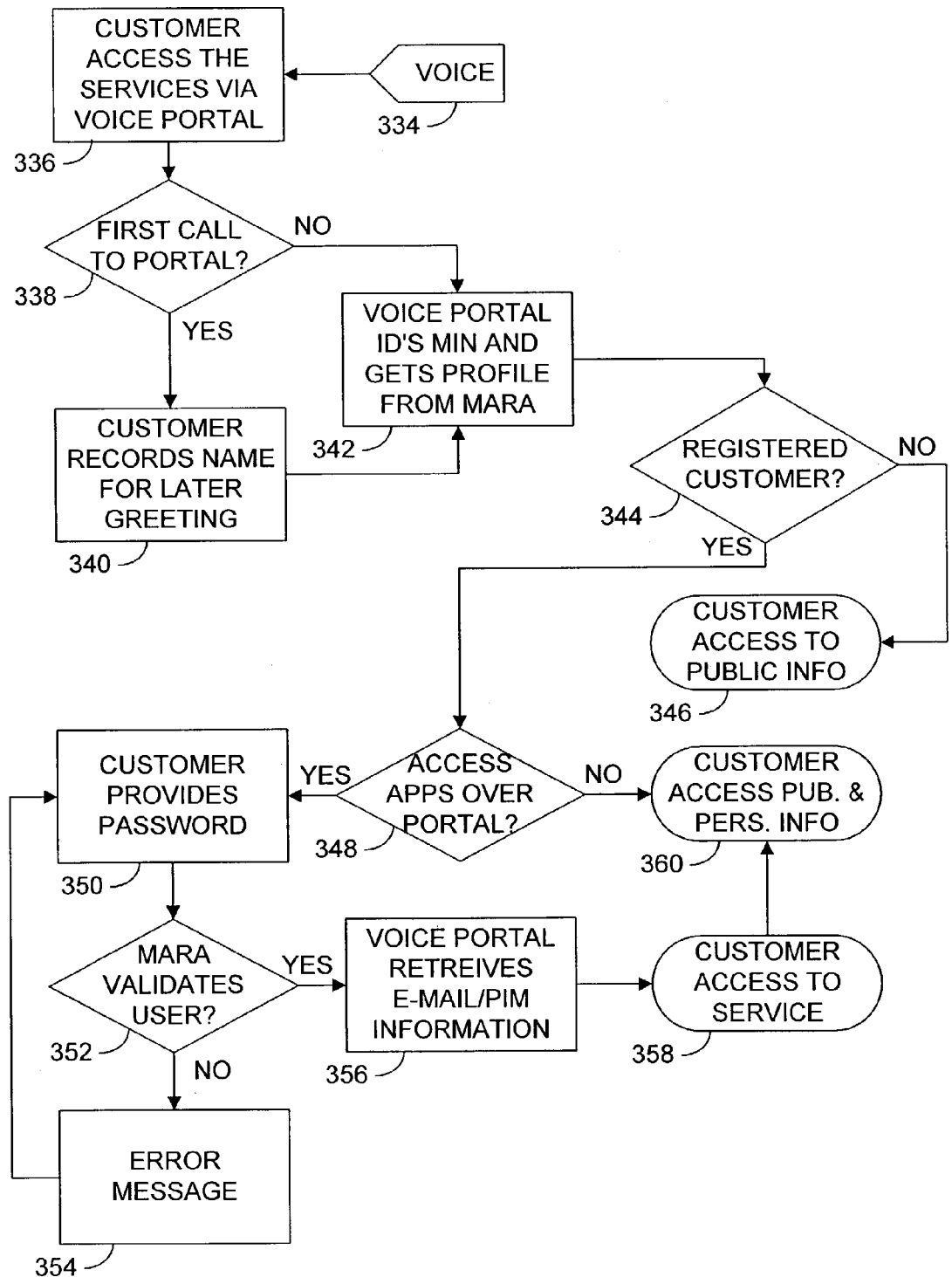
FIG. 3B is an embodiment, among others, of a flowchart of a method used by the system of FIG. 1.

Referring now to FIGS. 3A and 3B, shown is a flowchart for incoming requests to the communication facilities 100 multiple access internet portal 133. With respect to FIG. 3A, in step 300, the portal 158 receives a call from a customer interested in the multiple access internet portal 133 services. The portal then prompts the customer to choose the platform with which he or she wishes to access the portal, as shown in step 302. In one example, among others, the choices for the access platforms are generally split into voice access and WAP, SMS and web access.

If the customer chooses to access the system via a WAP, SMS or web interface, the multiple access internet portal 133 will prompt the user to make a choice about which services the customer wishes to access, internet or applications, as shown in step 304. If the customer wishes to access application information, the carrier will begin the validation process for new service, as shown in step 306. In step 308, the carrier will populate the customer database in the WIS 134 with the services requested. The WIS 134 then synchronizes with the MARA 138 by transmitting the new information to the MARA 138, as shown in step 310. The MARA 138 provisions an account for the user for the e-mail application 162 and PIM application 164, as shown in step 112, and provisions any other service requested by the customer in step 314. The MARA 138 then sends confirmation of the provisioning to the customer, as shown in step 316. The customer can then access the application services for the first time, as shown in step 318. One skilled in the art should recognize that for a user that is not connecting to the system for the first time, the system can merely authenticate the user and provide the application services based upon the services for which the customer had previously been provisioned. If the customer has requested a service not previously provisioned, the carrier can provision him or her accordingly.

If the customer previously selected internet information in step 304, the multiple access internet portal 133 prompts the customer whether he or she wishes to access personalized information, as shown in step 320. If the customer does not wish to access personalized information, the multiple access internet portal 133 could provide access to a public website that is not personalized, as shown in step 322. If the customer does want access to personalized information, the multiple access internet portal 133 sends the multiple access internet portal webpage to authenticate the customer, as shown in step 324. The MARA 138 then validates the customer as shown in step 326. If the customer enters an incorrect password, the MARA 138 sends an error message to the customer, as shown in step 328. If the customer enters the correct password, the customer is offered the ability to personalize the information sent to the SMS or WAP device 110, 108, as shown in step 330. The customer then has access to the internet service, as shown in step 332.

Referring now to FIG. 3B, shown is a flowchart resulting from when a customer chooses to access the multiple access internet portal 133 using the voice portal 152. Following the flag 334 of FIG. 3A, the customer starts to access the multiple access internet portal 133 services via the voice portal, as shown in step 336. The voice portal determines if this is the caller's first access to the voice portal in step 338. If it is the caller's first access to the portal 158, the voice portal provides the customer the opportunity to record his or her name for later greeting, as shown in step 340, and proceeds to retrieve the caller's MIN and profile from the MARA 158, as shown in step 3422. If the customer has called the voice portal before, the voice portal proceeds with step 342. The multiple access internet portal 133 then determines whether the customer is a registered customer, as shown in step 344. If the customer is not a registered customer, the multiple access internet portal 133 provides access to the public information available, as shown in step 346.

If the customer is a registered customer, the multiple access internet portal 133 prompts the user whether he or she would like access to applications over the portal 158, as shown in step 348. If the customer requests access to the applications over the portal 158, the portal 158 prompts the customer for his or her password, as shown in step 350. The MARA 138 then validates the customer to determine whether the password is valid, as shown in step 352. If the password is invalid, the portal 158 sends an error message to the user in step 354 and returns to step 350. If the password is correct, the voice portal retrieves e-mail/PIM information, in accordance with step 356, and provides the customer with access to the service as shown in step 358. If the customer does not wish to access applications over the portal 158, at step 348, the multiple access internet portal 133 provides the customer access to public and personal internet information, as shown in step 360.

One skilled in the art should understand that the password and MIN could be provided by the user at the beginning of the call in order to authenticate the user for all services for which he or she has been provisioned. Thus, a thief could not steal a wireless device and gain access to any of the personalized information contained therein. In the embodiment outlined above, however, a business decision was made to allow access to the internet information without authenticating the user, since more sensitive information is included within the applications as opposed to the internet.

Figure 4:
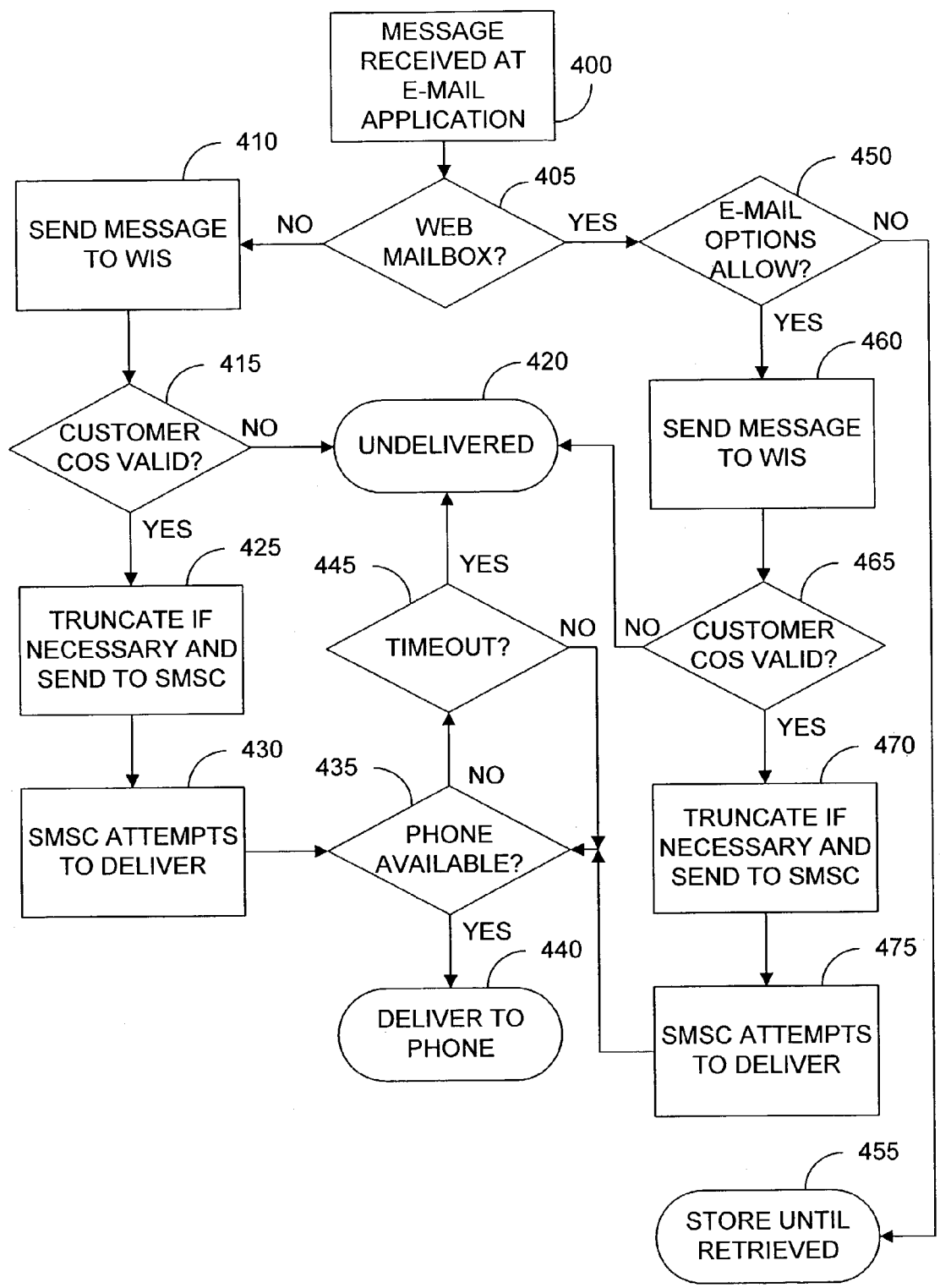
FIG. 4 is an embodiment, among others, of a flowchart illustrating the method used for e-mail delivery to short message service telephones on the system of FIG. 1.

Referring now to FIG. 4, shown is a flowchart of an e-mail delivery to an SMS phone. The e-mail application 162 can provide an e-mail account to the user. The e-mail account will be accessible from his/her telephone (both mobile and fixed landline) or through an internet-connected computer 106. Providing an e-mail application 162 through a telephone carrier that can be accessed from multiple platforms can be an inexpensive way for a customer to have an e-mail account, without requiring a computer or an ISP.

When an e-mail message is sent to an SMS enabled phone 110, the e-mail application 162 first receives the message, as shown in step 400. Delivery of an e-mail message to a customer on an SMS phone depends on the options the user has set-up with the content provider, as shown in step 405. If the customer has not setup a web mailbox, a message received by the system will be directed to the WIS 134, as shown in step 410. The WIS 134 will then associate the message with a customer's MIN and the customer's class of service as provisioned by the carrier upon registration, as shown in step 415. If the customer is not provisioned to receive SMS e-mail, the message is undelivered, as shown in step 420. If the customer is provisioned, the WIS 134 will truncate the message if longer than 150 characters as defined by an SMS standard and send the message to the SMSC, as shown in step 425. The SMSC 126 will then attempt to deliver the message to the recipient, as shown in step 430. The SMSC will determine if the phone is available, in step 435, and deliver the message in step 440 if the phone is available. If the phone is not available, the WIS 134 will allow the message to be retried until a pre-set timeout if the SMS phone 110 cannot be reached, as shown in step 445. If there is a timeout in attempting to deliver the message, the message will go undelivered, as shown in step 420.

If the customer has setup a web mailbox, the e-mail application 162 will receive an e-mail message and check the options which the user has setup with regard to the e-mail application 162, as shown in step 450. These options could indicate that certain messages be delivered while others are stored at the content provider, that all messages are delivered, or that all messages are stored. As shown in step 455 the messages will be stored if the options are such that they do not allow delivery to the SMS phone. The MARA 138 will update the customer profile to indicate the presence of new mail. If the options allow the delivery of the messages, the e-mail application 162 will send the messages to the WIS 134 if they are to be delivered upon receipt, as shown in step 460. The WIS 134 will then associate the message with a MIN for the recipient and the customer's class of service as provisioned by the carrier upon registration, as shown in step 465. If the customer's class of service does not allow for delivery of the message, the message will remain undelivered, as shown in step 420. The WIS 134 will then forward the message to the SMSC 126, truncating the message if it is longer than 150 characters, as shown in step 470, and the SMSC will attempt to deliver the message in step 475. The SMSC then determines whether the SMS phone 110 is available in step 435. If the SMS phone 110 is available, the message is delivered, as shown in step 440. If the SMS phone 110 is unavailable, the WIS 134 will allow the SMSC to continue attempting to deliver the message until a preset timeout if the SMS phone 110 is not available, as shown in step 445.

One skilled in the art should understand that an SMS phone could respond to e-mail by sending a text message back to the originating mobile number. Moreover, the WIS 134 and e-mail application 162 could be made operable to route a text message from a mobile phone to a standard (non-mobile) e-mail address. Thus, a customer could reply to a received message by sending a text message back to the WIS 134.

Figure 5:
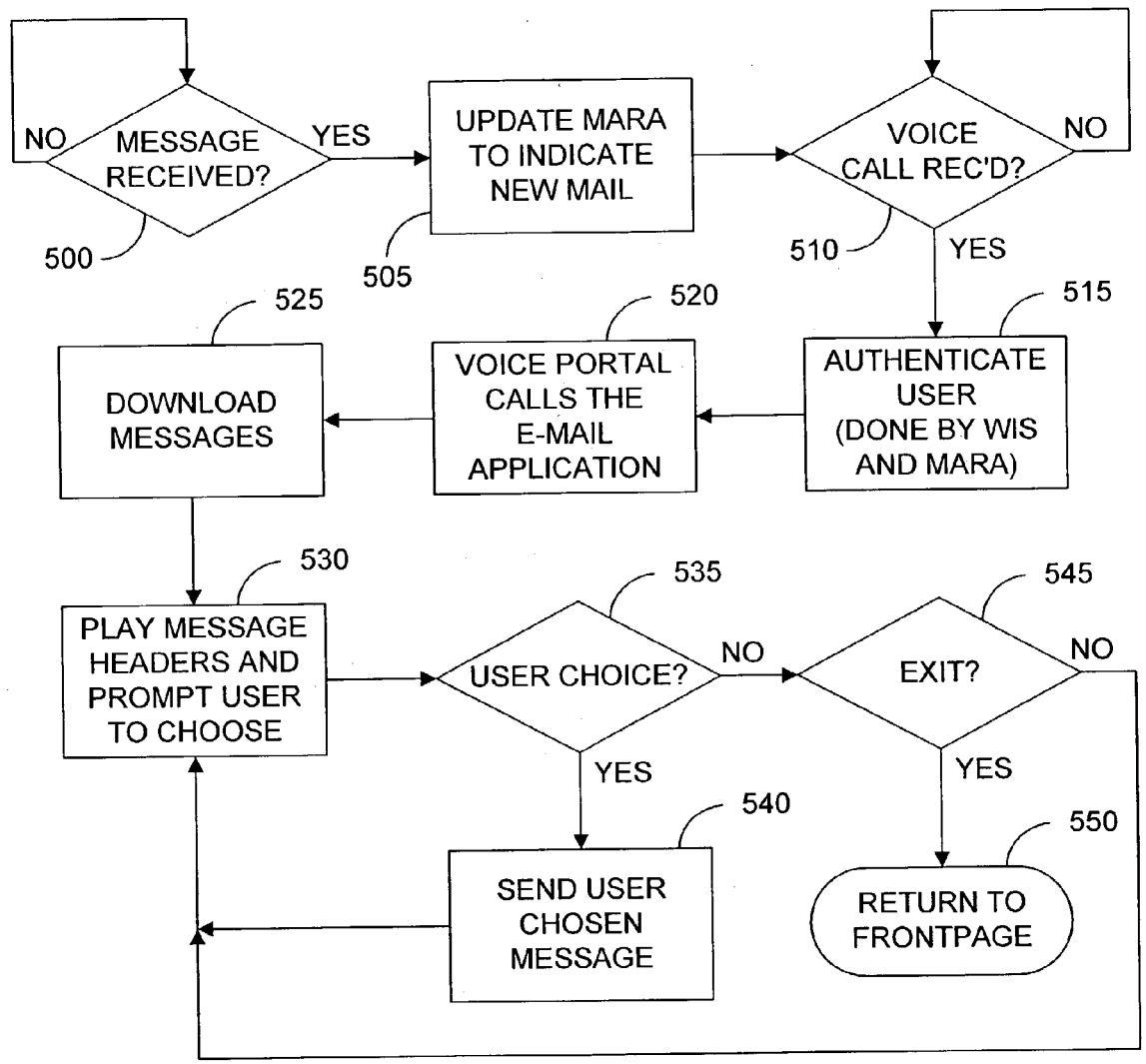
FIG. 5 is an embodiment, among others, of a flowchart illustrating the method used for e-mail delivery over voice on the system of FIG. 1.

Referring now to FIG. 5, shown is a flowchart for receiving e-mail messages via the voice portal. With regard to step 500, the e-mail application 162 waits to receive e-mail. Upon receiving e-mail, the e-mail application 162 updates the MARA 138 to indicate that new mail is present, as shown in step 505. In step 510, the system waits to receive a voice call from a customer associated with the e-mail address. When a voice call is received from the customer corresponding to the message, the customer is authenticated in step 515 by the WIS 134 and MARA 138. After the customer has connected to the voice portal 152, the customer can request access to his or her e-mail from the e-mail application 162. The voice portal 152 will then call the e-mail application 162 via the internet in step 520 and download the customer's e-mail to the voice portal, as shown in step 525. The voice portal 152 will then use text to language (TTL) technology to play the message headers to the customer, as shown in step 530. The voice portal 152 then prompts the customer to choose a message in step 535. If the customer chooses a message, the voice portal plays the message to the customer using TTL, as shown in step 540, and then returns to step 530. If the customer does not choose to listen to the message, the voice portal prompts the customer to determine if he or she wishes to exit, as shown in step 545. If the customer wishes to exit, the voice portal 152 returns to the personalized front-page menu for the customer, as shown in step 550. However, if the customer does not wish to exit, the message headers can be played again in accordance with step 530.

One skilled in the art should recognize that after sending the customer a chosen message in step 540, there could be included another step which prompts the customer with several actions that could be performed in response to the message. A few examples, among others, of these actions could include saving the message, deleting the message, or replying to the message. Upon receiving a response to the prompt, the voice portal could perform the action specified by the customer. If the customer wishes to reply to the message, the voice portal could be configured to prompt the user to record a reply. The reply could then either be converted to text, or could be sent as an audio attachment to the message.

It should be recognized by one skilled in the art that receiving e-mail via a web browser can be provided in a similar manner to current web based e-mail programs. Moreover, WAP browsers can be provided in a similar manner to current WAP e-mail programs. Specifically, the GEN3 will receive a request from the customer for e-mail, and retrieve the e-mail from the e-mail application 162. The GEN3 can then generate an HTML or WML version of an e-mail page to send to the customer.

Figure 6:
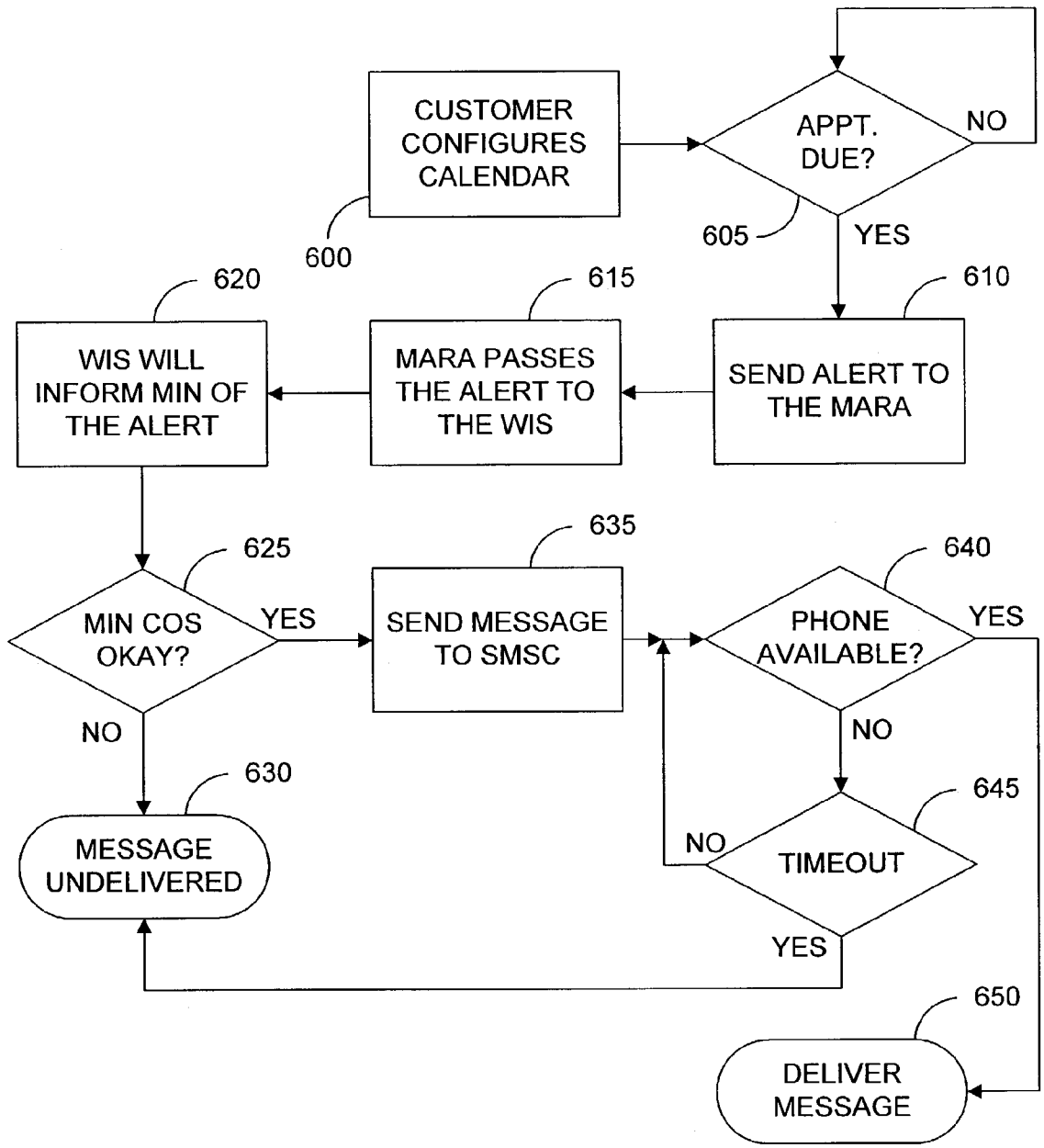
FIG. 6 is an embodiment, among others, of a flowchart of personal information manager application delivery over short message service on the system of FIG. 1.

Referring now to FIG. 6, shown is a flowchart illustrating the sequence of an SMS phone 110 receiving PIM 164 information. The PIM 164 is similar to a personal digital assistant (PDA). The PIM 164 can keep a calendar for the customer notifying him or her of appointments, meetings, deadlines, etc. The PIM 164 can also keep an address book for contacts the customer wishes to store. As one skilled in the art should recognize, other functions can be added to the PIM 164 without altering the scope of the present invention. Moreover, the location of the PIM 164 on a central server allows the customer to access his or her calendar from any of the platforms supported by the carrier.

As the first step 600, the customer configures the calendar information inside the web interface for the PIM 164. Once scheduled appointments are due, as shown in step 605, the PIM 164 will send an alert to the MARA 138, in step 610, which will, in turn, be passed to the WIS 134, in step 615. The WIS 134 will then inform the MIN of the alert, as shown in step 620. The WIS 134 will then check a class of service associated with the MIN as shown in step 625. If the class of service does not allow automatic deliver of messages, the message will remain undelivered as shown in step 630. If the class of service allows delivery of the message, the WIS 134 will send the message to the SMSC 126, as shown in step 635. The SMSC 126 will determine whether the SMS phone 110 is available in step 640. If the SMS phone 110 is not available, the WIS will allow delivery to be attempted until a preset timeout, as shown in step 645. After the timeout period expires, the message will remain undelivered. If the phone 110 is available the message will be delivered, as shown in step 650.

Figure 7:
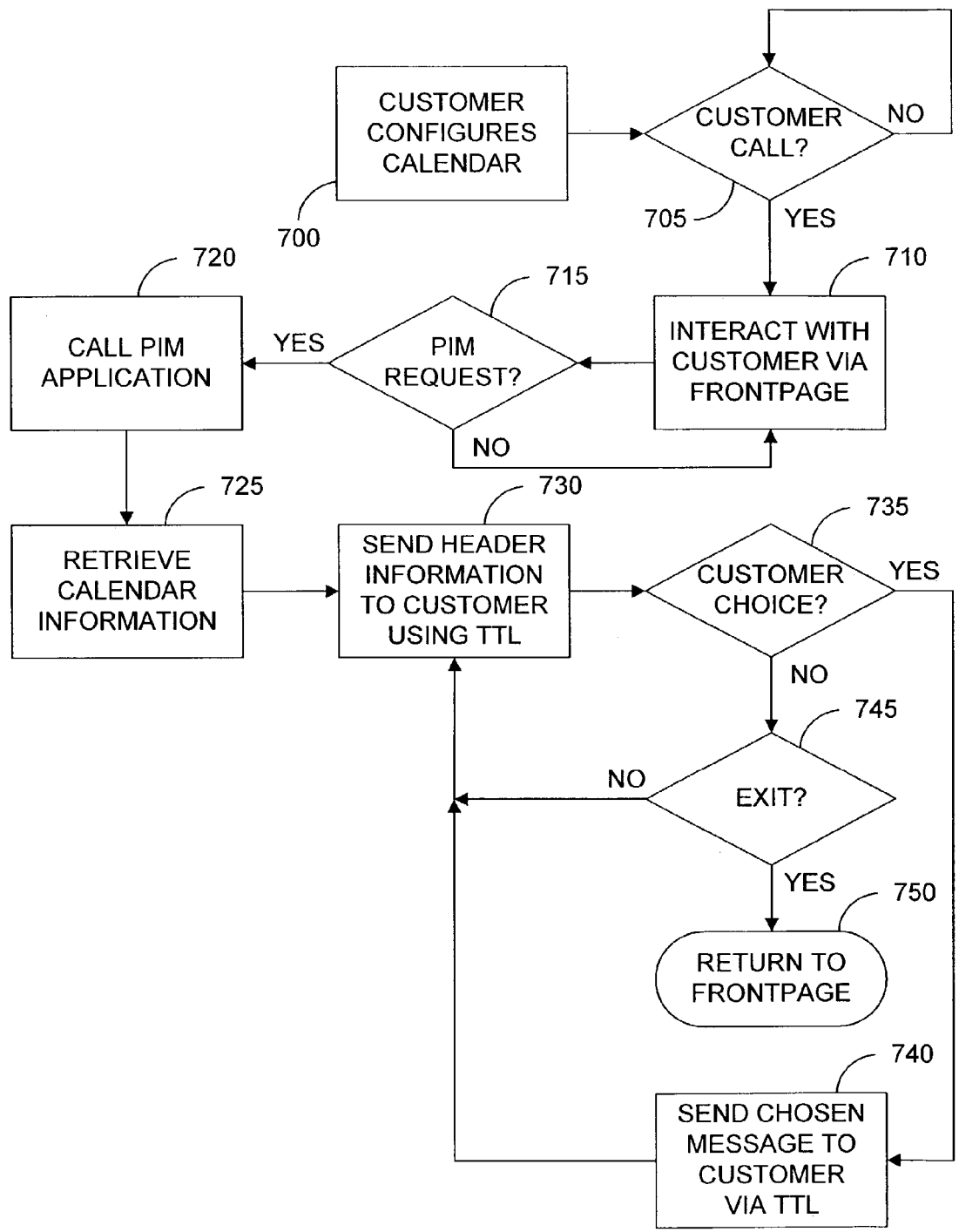
FIG. 7 is an embodiment, among others, of a flowchart of personal information manager application delivery over voice on the system of FIG. 1.

Referring now to FIG. 7, shown is a flowchart illustrating the delivery of PIM 164 information via a voice call. In the first step 700, the customer configures his or her calendar via a webpage interface for the PIM application 164. The system then waits for a voice call from the customer, as shown in step 705. In step 710, the system interacts with the customer via the personalized front-page associated with the user. This front-page could include a prompt from the MARA indicating that an appointment time is due. The user is then able to select whether to access the PIM 164, as shown in step 715. The voice portal 152 calls the PIM 164, as shown in step 720, and retrieves PIM 164 information associated with the customer, as shown in step 725. The voice portal 152 then sends the header information to the customer using TTL, as shown in step 730. The customer is then prompted to choose which message to listen to, as shown in step 735. In step 740, if the customer makes a choice, the chosen message is played to the customer using TTL. The voice portal then plays the message headers again, in accordance with step 730. If the customer does not make a choice, the voice portal 152 prompts the customer to determine if he or she wishes to exit the PIM, as shown in step 745. If the customer wishes to exit, the voice portal returns the customer to the personalized front-page, as shown in step 750. One skilled in the art should recognize that the system could be modified to notify the user when an event comes due by sending an alert to the WIS 134 and having the voice portal call the customer and play a reminder. Furthermore, the information entered to the calendar need not be entered through the web display, but could be entered over the phone via an IVR menu system. Thus, reminders can also be recorded as .wav (or other suitable audio file format) and replayed to the user without using TTL technology.

One skilled in the art should understand that receiving PIM 164 information via a web browser can be provided in a similar manner to current web based PIM applications. Moreover, WAP browsers can be provided in a similar manner to current WAP based PIM applications. Specifically, the GEN3 142 could receive a request from the customer for PIM information, and retrieve the calendar from the PIM application 164. The GEN3 142 can then generate an HTML or WML version of a calendar page to send to the customer.

Referring back to FIG. 1, the instant messaging application 166 typically allows users to send messages back and forth to one another in "real-time." Instant messaging applications 166 allow a user to communicate with another user who does not have a mechanism to transmit voice, or a user who merely does not wish to talk. Instant messaging applications 166 are somewhat similar to the text-messaging present in phones today. However, there is presently no system that allows instant messaging to communicate with phone users as well as computer users. Moreover, the centralized instant messaging application 166 could allow customers using different instant messaging clients to communicate regardless of the incompatibilities across different clients. The customer would typically initiate the instant messaging application 166. However, in some embodiments, among others, the user can choose to be notified via the instant messenger when they receive new e-mail, forward instant messages to their cell phone or page, and specify the type of content to be displayed.

With respect to the chat application 168, the chat application 168 is much like internet chat and instant messaging applications presently existing. It allows multiple users to connect in a chat room to discuss whatever topic they would like to discuss. One skilled in the art should understand that typically the customer would initiate use of this application 168 during an internet session.

With regard to the commerce application 170, the commerce application 170 will allow a customer to make purchases and payments over the internet. This application 170 can allow the user to save purchasing information and addressing online. This application 170 can reduce the necessity to enter the same information every time a buy is made on the customer's behalf. Moreover, this application 170 could interface with the pre-paid or post-paid billing platforms 116, 114 and charge the customer's account upon a purchase or payment.

With respect to the location application 172, the location application 172 can provide useful information to the customer based on the customer's location. The location is determined by the location determination system 124 discussed previously. Some such useful information in localized form might include weather, restaurants, nightlife, maps, gas stations, etc.

Figure 8:
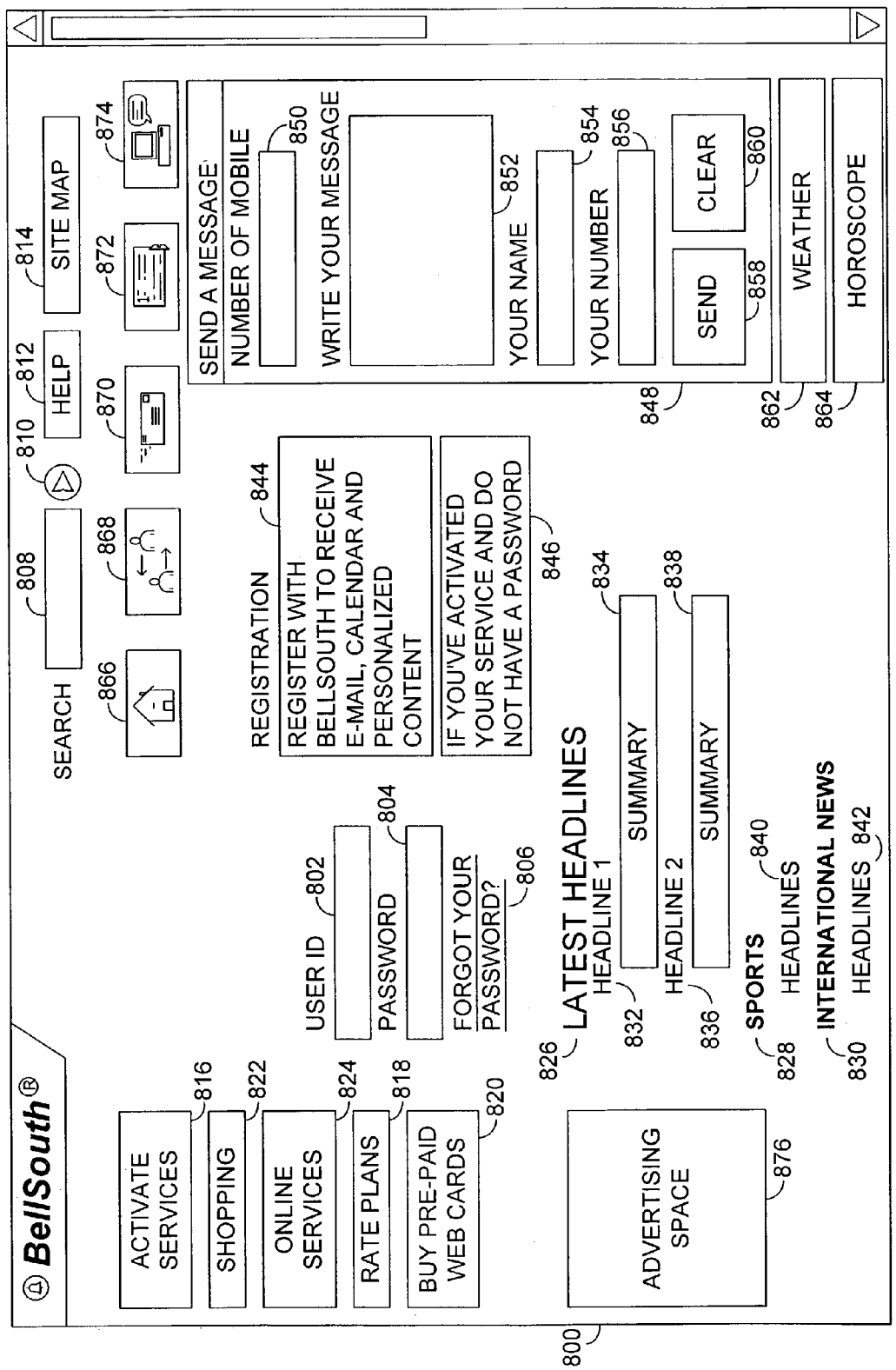
FIG. 8 is an embodiment, among others, of an illustration of a sample screen shot of a public web interface provided by the system of FIG. 1.

Referring now to FIG. 8, shown is an illustration of a sample screen shot of an embodiment, among others, of the web interface 800 of the present invention. The web interface shown is the portion of the web interface 800 that the general public is typically allowed to access. If the user wishes to access personalized information, he or she can enter a user identification into the user id field 802 and his or her password into the password field 804. All of the public information shown on the public web interface 800 will be accessible to every user who has signed on to the system, as well as personalized information.

If the user has forgotten his or her password, a link 806 is provided through which the user can retrieve his or her password. Typically, this link would lead to a page at which the user is prompted to answer a secret question. In order for the MARA 138 to retrieve the password, the user's answer to the question must match the answer stored in the database 140. Upon entering the correct answer to the question, the user can be provided with his or her password through the web interface, or via e-mail, phone, etc.

One skilled in the art should recognize that the content provider could provide for both registered users and casual users. A registered user would be a user who is provisioned to use at least one of the wireless devices to access his or her personalized information. A casual user would be a user who merely enjoys the web interface provided by the content provider, and personalizes the web interface, but is not provisioned to access the personalized information via a wireless device.

The public web interface 800 can typically provide a search engine where the user can enter a string of alphanumeric characters into the search field 808, and select the start search representation 810 using a mouse (or other selection tool) to search the internet for the string. Alternative embodiments, among others, of the search engine could provide a search of a specific area of the internet or the portal itself.

The public web interface 800 typically also provides a help screen. The help screen can be accessed by the user through selecting the help representation 812. The help screen can be used by the user to access a frequently asked questions (FAQ) page, can access a plethora of topics upon which help is available, or could provide contact information for a customer service representative to assist in solving the user's problem.

The public web interface 800 can typically also provide a link 814 to a site map of the content provider. The site map can assist users in navigating the website. This feature is especially convenient when the user wishes to access a specific feature, and has forgotten the location of the feature, and for new users to explore the available features of the content provider.

The public web interface 800 can also offer further information about the multiple access internet portal 133, such as helping users register with the service through the activate services button representation 816. Rate plans for the plan can be accessed by selecting the rate plan button representation 818. The user can also choose to buy pre-paid web card by selecting the buy pre-paid web card button representation 820. Each of these linked web pages will provide more information about the service to public and casual users of the website, as well as registered users.

Another service provided by the public web interface 800 could include a shopping page linked by a shopping button representation 822. The shopping page would allow users to consummate online transactions with various third party vendors or with the content provider or carrier. Online shopping has become an increasingly popular way to increase revenue for business while decreasing capital expenditures required to operate a so-called brick-and-mortar storefront. Moreover, online shopping provides greater convenience for buyers who do not wish to travel to a storefront, or who wish to shop at hours during which a storefront would normally be closed for business.

The public web interface 800 could further provide a user with access to online services through an online services button representation 824. Some of these online services can include, among many others, viewing account balances, summarized call detail records, billing statements, pay bills online, advise clients on the proper calling plan, etc. These online services would facilitate customer interaction with the carrier, providing more flexible options to the user in interacting with the carrier.

The public web interface 800 would also provide a generic non-personalized news section accessible to all users. On a personalized page, this news section would be organized and customized to the user's specification. Typically, the non-personalized news section could provide the latest headlines section 826, sports news section 828, and international news 830 section to the user. Under the latest headlines section 826, the public web interface 800 could provide a first headline 832 associated with a first news story. The public web interface 800 could also provide a summary 834 associated with the first news story. Similarly, the public web interface 800 could provide a second headline 836 and summary 838 associated with a second news story. One skilled in the art should recognize that there could be any number of headline stories shown on the public web interface 800, and that alternatively, the user could select the latest headline to receive the headlines and summaries of the latest news stories. Furthermore, the headlines could include pictures next to the headlines in some embodiments, among others, of the public web interface 800.

With regard to the sports news section 828 and the international news section 830, the public web interface could be configured to merely show the headlines 840, 842 associated with the respective section news stories. One skilled in the art should understand that these sections could also include summaries and/or pictures associated with the respective headlines. Moreover, the sections 828, 830 could merely link to a sports news or international new page, respectively. Further, one skilled in the art should recognize that all of these categories could be user configurable on a personalized front-page. For example, among others, sports news sections 828 and international news sections 830 could be replaced or supplemented by a plethora of other categories of news, and each of these is intended to be within the scope of the public web interface 800.

Near the login fields 802, 804, the public web interface 800 could further contain links to help the user with the login process. A registration link representation 844 could be provided which would guide the user to a registration page upon the user selecting the registration link representation 844. At the registration page the user could be prompted to enter personal information such as name, home number, cellular number, address, devices to be included on the service, etc. Another useful link to locate next to the login fields 802, 804 would be a newly provisioned user link representation 846. This link representation 846 when selected would take a user that has been provisioned to the service, but is a first time visitor, to a page where the user could enter information regarding which devices the user wishes to include on the service, along with providing a password, and personalizing the content for the user.

Another application, which could be included in some embodiments, among others, of the public web interface 800, could include a short message service application. The application could include a send message representation 848. The send message representation 848 would include a field representation 850 for the user to enter the number of the receiving wireless device. The send message representation 848 would also include a composition field representation 852, which would allow the user to compose the message to a recipient. Further, the send message representation 848 could include a field representation for the sender's name 854, and contact number 856. Upon completing these fields, the user could select to send the message using the send button representation 858. At any time during the composition process that the user decides not to send the message, the user can select a clear button representation 860, which will cause the short message service application to clear all of the fields 850, 852, 854, 856 associated with the short message service application.

Further service that could be included on the public web interface 800 include a weather representation 862 and a horoscope representation 864. The weather representation 862 could provide a link to a page where the user could enter a city or postal code to determine the local weather in that city or postal code. One skilled in the art might also recognize that the location of the user might be roughly determined according to the internet protocol (IP) address from which the user is accessing the website, or the location of the last relay node before hitting the user. Alternatively, the content provider could choose a large city, or a number of large cities, or the capital of its home country to display by default. With regard to the horoscope representation 864, the horoscope representation could provide a user with the horoscope corresponding to the current date. Moreover, the horoscope representation could provide a link to more detailed horoscope information, and allow the user to enter his or her birth date, and get a personalized horoscope based upon the user's birth date. One skilled in the art should recognize that there are numerous other generalized representations that could be displayed on the front page of a public web interface 800, such as, but not limited to, movie releases, stock quotes, travel information, etc.

Another set of links that could be provided on the public web interface 800, include short-cuts to personalized web applications that can be accessed by registered users. Such short-cuts could include a homepage representation 866 which, when selected by the user, will take a user to his or her personalized front-page after receiving a user identification and password from the user. Another such short-cut could include an instant messaging representation 868 which, when selected by a user, would launch an instant messaging session after receiving a user identification and password from the user. The short-cuts could also include an e-mail representation 870 which, when selected by a user, could either launch an e-mail application on the user's machine or take the user to the user's web mailbox after receiving a user identification and password from the user. A PIM representation 872 could also be included in the short-cuts available to registered users. Upon selection of the PIM representation 872 the user could retrieve his or her address book, calendar, and other personal information upon providing a user identification and password. Another application that could be included in the short-cuts available to registered users is the chat application representation 874. Upon selecting the chat application representation 874, the user will be taken to a chat website facilitated by a chat application on the content provider after providing a user identification and password.

The public web interface 800 could also include an advertising space representation 876 for the content provider, carrier, or third party vendor. The advertising space representation 876 could be linked to a website corresponding to the person sponsoring the ad contained within the advertising space representation 876. Upon selecting the advertising space representation 876 so linked, the user would be taken to the website corresponding with the advertiser. Advertising revenue for content providers has typically been instrumental in the content provider's ability to provide a plethora of services to users. However, using the revenue sharing structure outlined above, the advertising revenue from the advertising space can also be split between the content provider and the wireless carrier. One skilled in the art should recognize that a number of sets of advertising space representations could be included on the public web interface 800, and that the inclusion of a single space is not meant to limit the interface 800 to having one advertising space representation 876.

Figure 9:
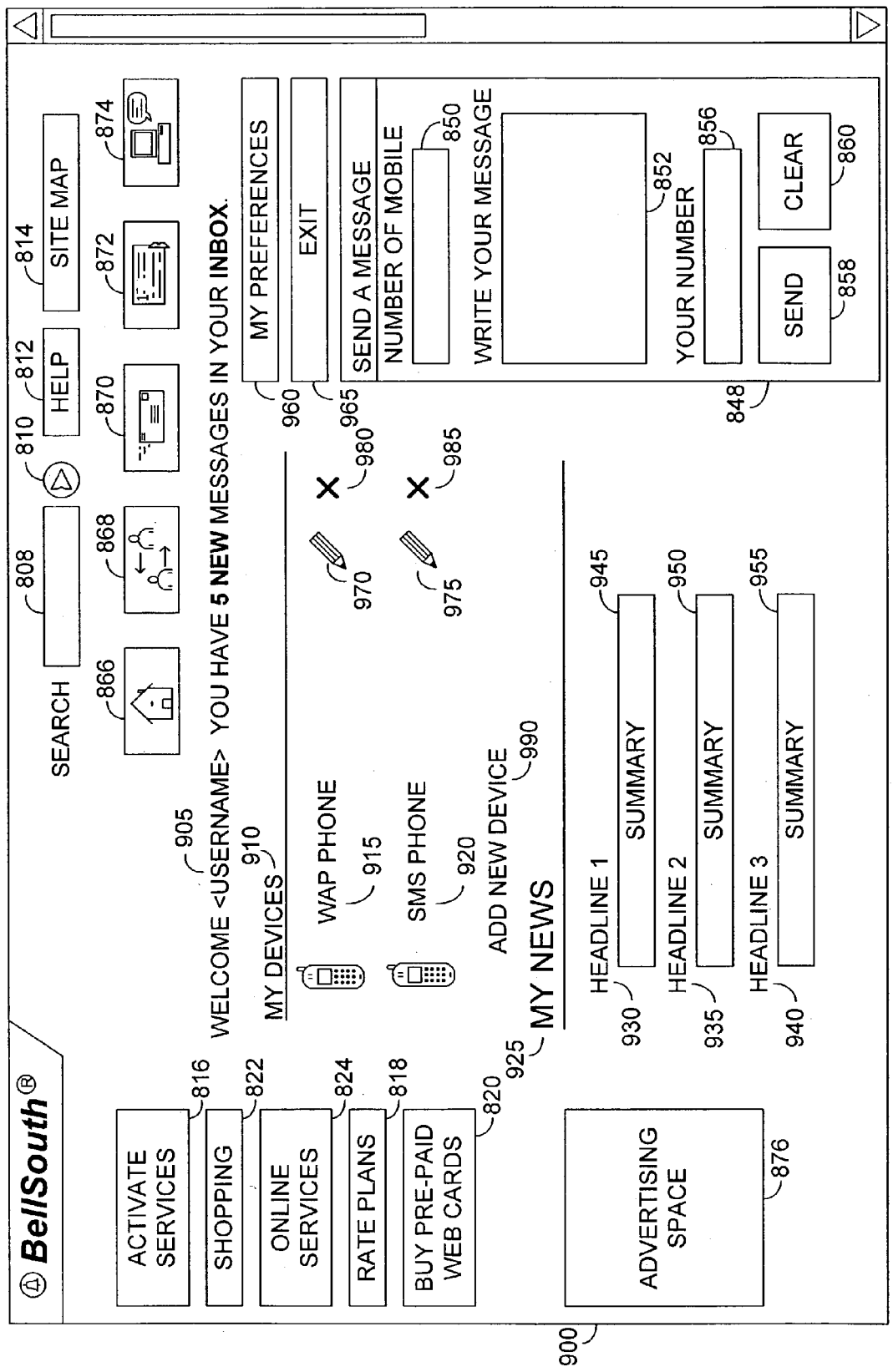
FIG. 9 is an embodiment, among others, of an illustration of a sample screen shot of a customized web interface provided by the system of FIG. 1.

Referring now to FIG. 9, shown is an illustration of a customized screen in an embodiment, among others, of the present invention. After logging onto the system, the user receives a customized screen 900. The screen can include, among others, a welcome message to the user 905, which could include the number of new messages contained stored in the user's inbox. The customized screen 900 could also include a summary of the devices 910 which the user has enabled to access information via the multiple access internet portal 133. In this example, the devices include a WAP enabled phone 915 and an SMS enabled phone 920. The customized screen 900 would typically also include a personalized news section 925, which provides a plurality of headlines 930, 935, 940. Each of the headlines 930, 935, 940 would typically have a short summary 945, 950, 955, following the respective headline.

The customized screen would further include a "My Preferences" representation 960, which could be selected by the user to view the user's preferences. In this section the user could rearrange portions of the customized screen 900, select new content to be displayed in the My News representation 925, and otherwise customize the user's experience with the multiple access internet portal 133 across a variety of platforms. The user could also select the exit representation 965 in order to log off of the multiple access internet portal 133.

Returning to the "My Devices" section representation 910, each device can be selected to edit using the respective edit option representation 970, 975. At these edit screens the user can customize the options available to the respective wireless devices from the multiple access internet portal 133. Furthermore, with respect to SMS devices, the user can specify what types of updates he or she wishes to receive at the SMS device, and how often he or she wishes to receive updates. The user can delete the devices listed in the "My Devices" section representation 910 by selecting the respective delete representation 980, 985. The user can add another device by selecting the "Add New Device" link representation 990. Upon selecting the "Add New Device" link representation 990, the user will be taken to a setup screen which will allow the user to specify a name for the device, a type for the device, and an e-mail address (or other attributes) associated with the device.

Figure 10A:
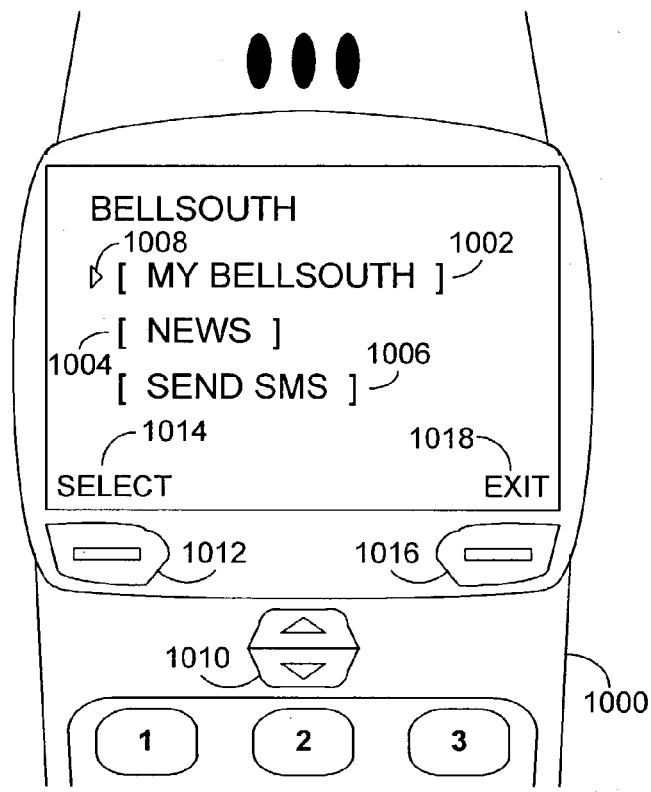
FIG. 10A is an embodiment, among others, of an illustration of a sample screen shot of a public wireless access protocol (WAP) interface provided by the system of FIG. 1 to a WAP enabled device.

Referring now to FIG. 10A, shown is an illustration of a sample screen shot from a WAP enabled wireless device 1000 using the system of FIG. 2. An initial screen could allow the user to choose to access personalized information by entering selecting a "My BellSouth" representation 1002. Alternatively, the user could select to view public news, or send SMS messages with the "News" representation 1004 and "Send SMS" representation 1006, respectively. The user can move the selection arrow representation 1008 over the option he or she wishes to select by using the scroll key 1010. Upon arriving at the option that the user wishes to choose, he or she can use the selection key 1012 to use the select representation 1014 to select the option highlighted by the arrow representation. Alternatively, the user could use selection key 1016 to select the exit representation 1018 to exit the system.

Figure 10B:
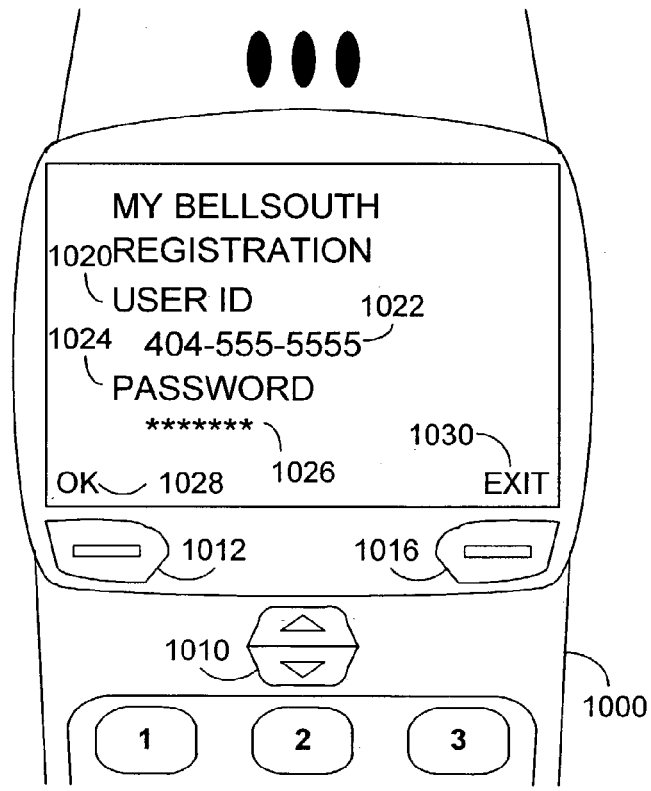
FIG. 10B is an embodiment, among others, of an illustration of a sample screen shot of a sign-on WAP interface provided by the system of FIG. 1 to a WAP enabled device.

Referring now to FIG. 10B, shown is a screen shot of the wireless device 1000 after selecting the "My BellSouth" option representation 1002 (FIG. 10A). Here the user can be required to enter a user id into the user id field 120. The user id is typically the user's mobile number and is entered in field 122. Alternatively, the system can detect the mobile number and pre-populate the user id field 120. The user is also prompted by the system to enter a password into the password field 124. The user may then enter his or her password 126 in order for the system to authenticate the request. Upon finishing, the user can select the "OK" representation 128 using the selection button 1012. Alternatively, the user can select the exit representation 1030 using the selection button 1016.

Figure 10C:
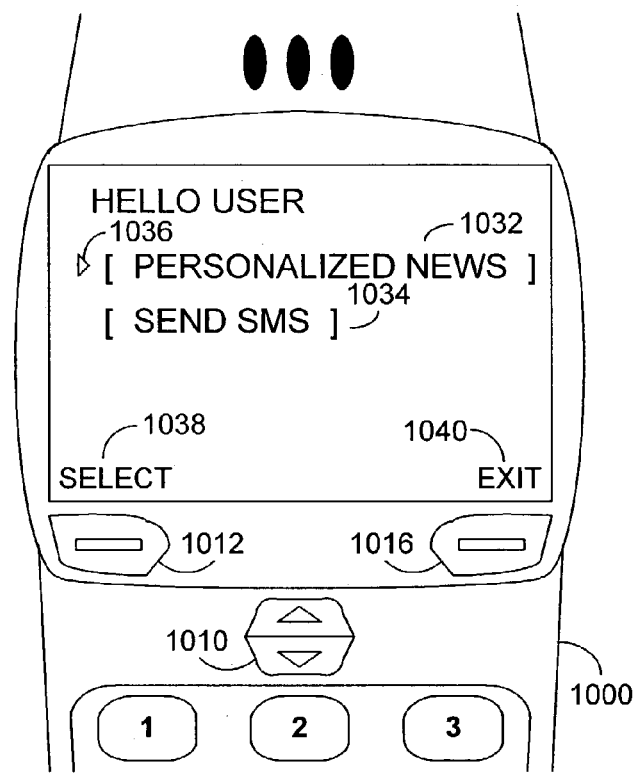
FIG. 10C is an embodiment, among others, of an illustration of a sample screen shot of a customized WAP interface provided by the system of FIG. 1 to a WAP enabled device.

Referring now to FIG. 10C, shown is a screen shot of the wireless device 1000 after the user has been authenticated. The user can now select a "Personalized News" option representation 1032 or "Send SMS" option representation 1034. Again, to select an option the user moves the arrow representation 1036 over the desired option with the scroll key 1010, and uses the select representation 1038 by pressing the select key 1012. The user could also exit the system using the exit representation 1040 by pressing the selection key 1016. One skilled in the art should recognize that the user may be allowed to see more options by scrolling to a second page (not shown). Moreover, the personalized information retrievable from the wireless device would be substantially similar to the information retrievable via the world wide web.

Figure 10D:
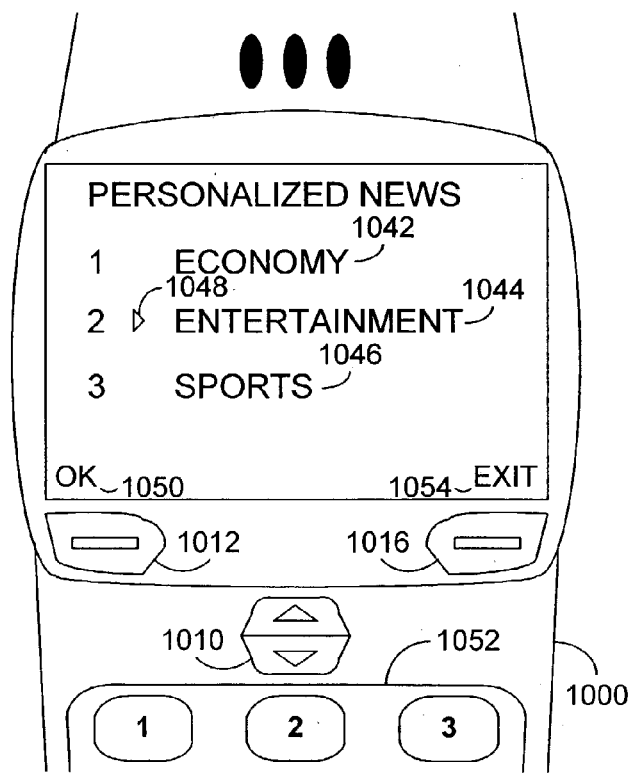
FIG. 10D is an embodiment, among others, of an illustration of a sample screen shot of a customized WAP interface provided by the system of FIG. 1 to a WAP enabled device.

Referring now to FIG. 10D, shown is a screen shot of the wireless device 1000 after the user has selected to view the "Personalized News" option representation 1032 (FIG. 10C). The user now has the option to choose among an "Economy" option representation 1042, an "Entertainment" option representation 1044, and a "Sports" option representation 1046. Again the user has the option of using the arrow representation 1048 in combination with the scroll key 1010 and selection key 1012 to select to view a particular option using the select representation 1050. Alternatively, the user can press a number on the mobile device keypad 1052 to select any of the options. The user can also choose to exit the system by selecting the exit representation 1054 with the selection key 1016.

One skilled in the art should recognize that there are an infinite number of alternative ways in which to display and order the information. In one such alternative, among others, the initial screen could require a password to access the system. Moreover, one skilled in the art should recognize that the particular screens shown vary widely between devices in terms of capability to display information and graphics.

One skilled in the art should recognize that any of the options shown in FIG. 9A could be included in the personalized screens of the wireless device 1000, including: latest headlines, sports, international news, weather and horoscope. Moreover, the personalized screens of the wireless device 1000 could include e-mail, calendar, or other secured applications.

Referring now to FIGS. 11A–11J, shown is a more detailed voice call flowchart of the system of FIG. 2. With respect to FIG. 11A, the voice portal welcomes the user in step 1100. In step 1101, the voice portal determines if the call is from a customer that has not used the voice portal before. This can typically be determined by detecting the phone number of the calling wireless device, or by prompting the user to tell the voice portal if it is his or her first time using the voice portal. If it is the user's first time using the voice portal, the user is sent to a first call process 1102.

Figure 11A:
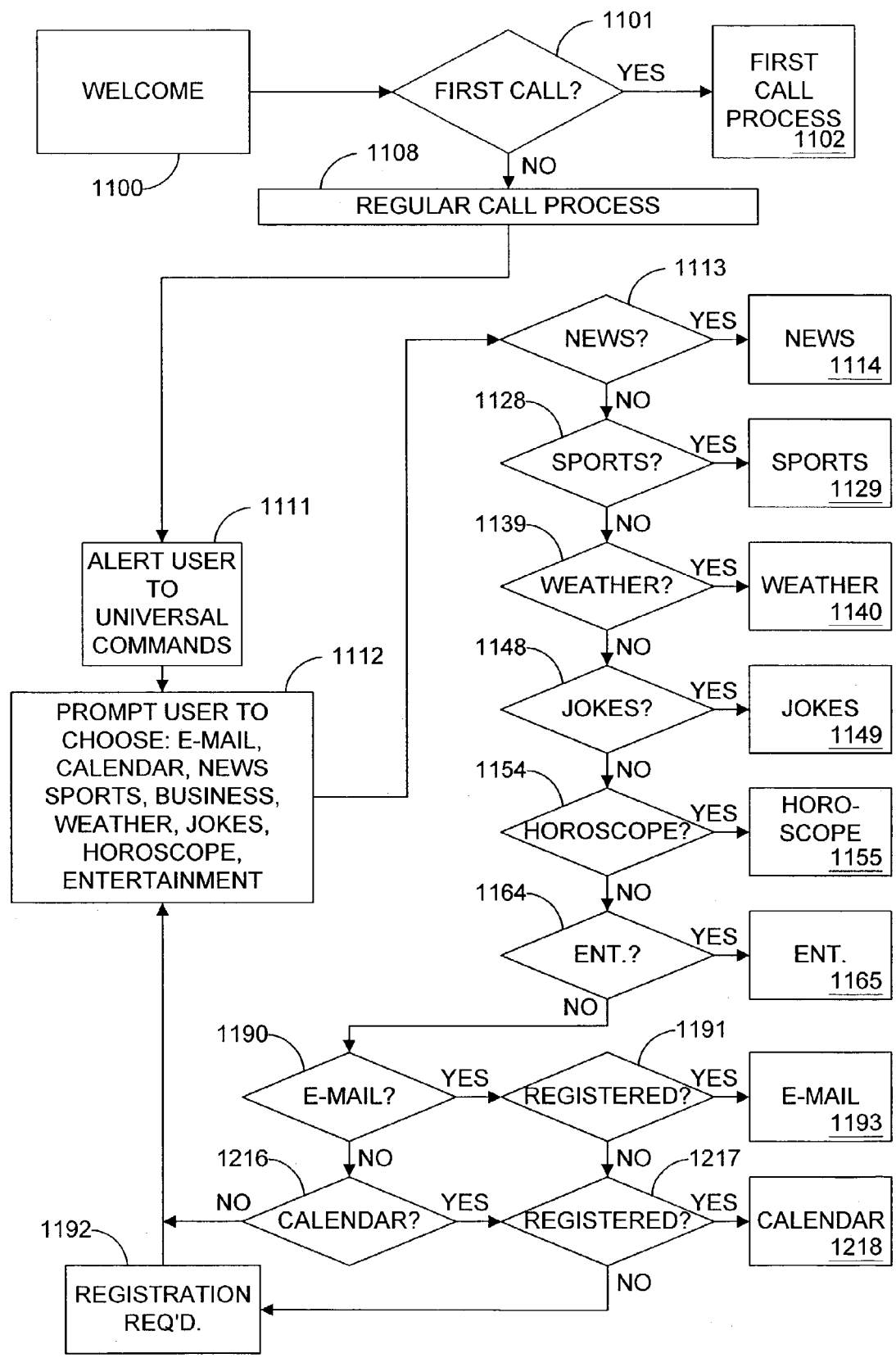
FIG. 11A is an embodiment, among others, of a flowchart for a regular call process used by the system of FIG. 1 to interact with voice callers.
Figure 11B:
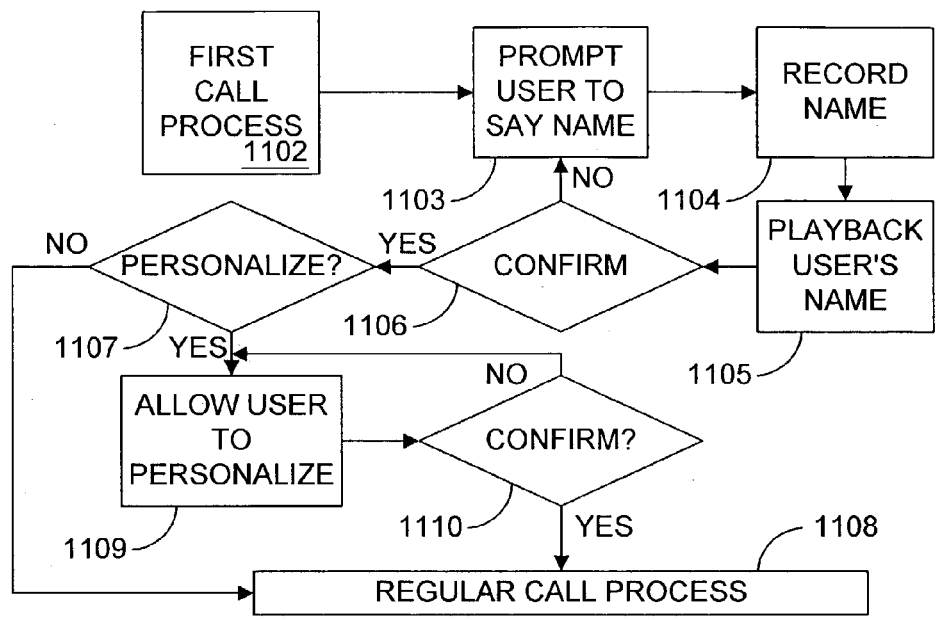
FIG. 11B is an embodiment, among others, of a flowchart for a first call process used by the system of FIG. 1 to interact with voice callers.

Referring now to FIG. 11B, shown is the first call process for a new user. In step 1103, the user is prompted to say his or her name. The voice portal records the user's name in step 1104, and plays the user's name back in step 1105. The voice portal then prompts the user to confirm the recording in step 1106. If the user does not confirm the recording, the voice portal returns to step 1103 to re-record. If the user confirms the recording, the voice portal prompts the user in step 1107 to determine whether he or she would like to personalize the services of the voice portal. If the user does not wish to personalize the services, the user will return to the regular call process 1108. If the user wishes to personalize his or her service, the voice portal allows the user to personalize the service in step 1109. Specifically, the personalization step 1109 could prompt the user to decide what types of services and information he or she would like to be available to the device. After personalization, the voice portal prompts the user to confirm the personalization in step 1110. If the personalization is not confirmed, the user returns to step 1109 to personalize the service. However, if the personalization is confirmed, the user will return to the regular call process 1108.

Returning to FIG. 11A, the voice portal alerts the user to a plurality of universal commands. These commands include help, main menu, cancel, exit, and location. One skilled in the art should recognize that the user can select these universal commands at any time during the call, and the voice portal will interrupt the current process and send the user to the selected universal command. In step 1112, the voice portal prompts the user to choose any of a number of subjects. Typically, these subjects can include, among many others: news, sports, weather, jokes, horoscope, entertainment, e-mail, and calendar, among others. Moreover, these subjects are typically the same subjects available via the web, WAP, and SMS interfaces. Furthermore, it should be recognized by one of skill in the art that the user could configure the process at the web interface to limit the subjects/applications available to the user through the voice.

Figure 11C:
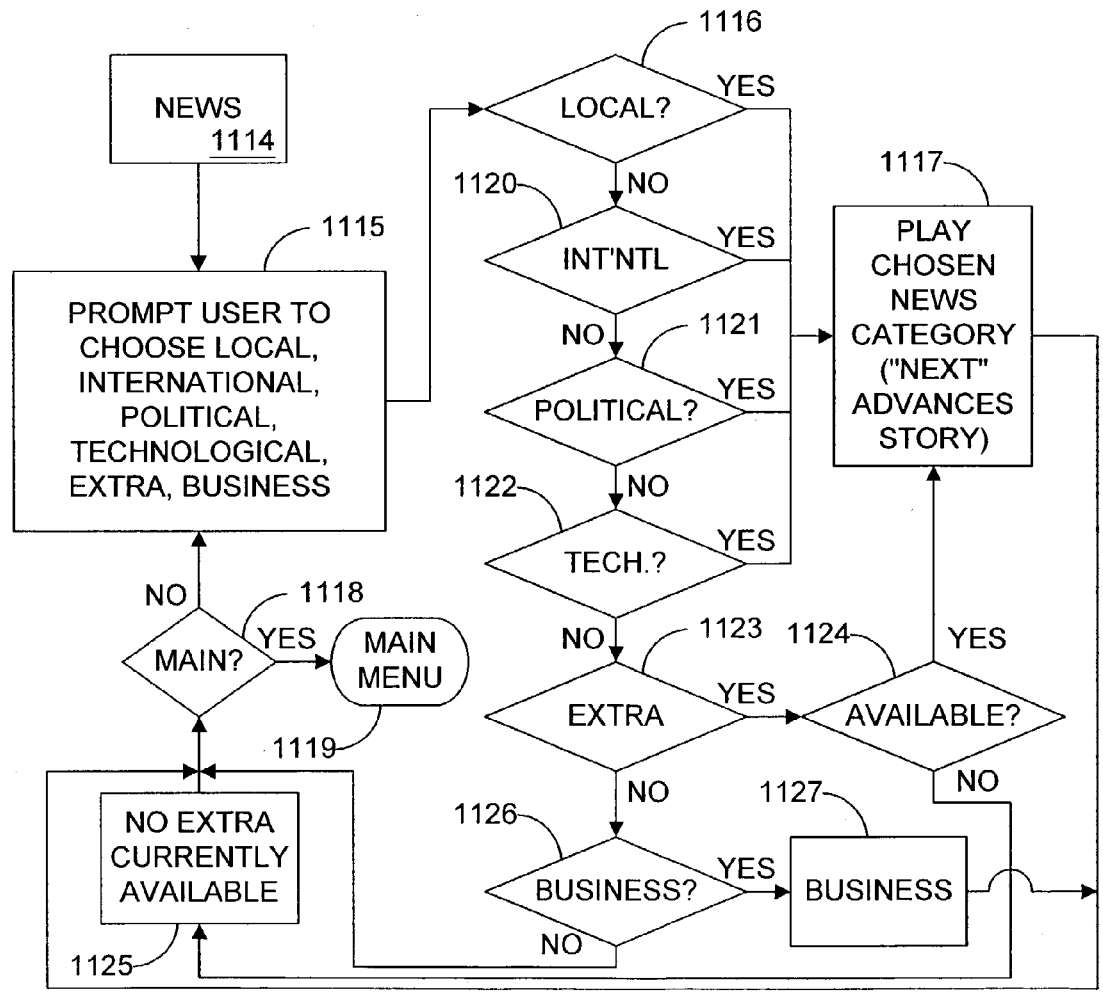
FIG. 11C is an embodiment, among others, of a flowchart for news content used by the system of FIG. 1 to interact with voice callers.

In step 1113, the voice portal determines if the user has selected to hear news. If the user has selected to hear news, the voice portal sends the user to the news page 1114. Referring now to FIG. 11C, the voice portal can prompt the user to choose local, international, political, technological, or business news in step 1115. The voice portal then determines if the user has chose local news in step 1116. If the user has chosen local news, the voice portal retrieves the local news and plays it back to the user in step 1117. The voice portal then prompts the user whether or not he or she would like to return to the main menu in step 1118. If the user wishes to return to the main menu, the voice portal returns to the regular call process 1108. If the user wishes to remain in the news section 1114, the voice portal returns to step 1115.

If the user did not choose local news in step 1116, the voice portal determines whether the user chose international news in step 1120. If the user chose international news, the voice portal retrieves international news in step 1117 and plays it back to the user. After playing the international news to the user, the voice portal prompts the user if he or she would like to return to the main menu in step 1118. The voice portal returns to the regular call process 1108 in step 1119, if the user chooses to return to the main menu. Otherwise, the voice portal prompts the user to choose a type of news in step 1115.

If the user did not choose international news in step 1120, the voice portal determines whether the user chose political news in step 1121. If the user chose political news, the voice portal retrieves political news in step 1117 and plays it back to the user. After playing the political news to the user, the voice portal prompts the user if he or she would like to return to the main menu in step 1118. The voice portal returns to the regular call process 1108 in step 1119, if the user chooses to return to the main menu. Otherwise, the voice portal prompts the user to choose a type of news in step 1115.

If the user did not choose political news in step 1121, the voice portal determines whether the user chose technological news in step 1122. If the user chose technological news, the voice portal retrieves technological news in step 1117 and plays it back to the user. After playing the technological news to the user, the voice portal prompts the user if he or she would like to return to the main menu in step 1118. The voice portal returns to the regular call process 1108 in step 1119, if the user chooses to return to the main menu. Otherwise, the voice portal prompts the user to choose a type of news in step 1115.

If the user did not choose technological news in step 1122, the voice portal determines whether the user chose extra news in step 1123. If the user chose extra news, the voice portal determines whether there is any extra news available in step 1124, and plays it back to the user in step 1117 if there is extra news available. If there is no extra news available, the voice portal alerts the user in step 1125. After either playing the extra news to the user or alerting the user that there is no extra news, the voice portal prompts the user if he or she would like to return to the main menu in step 1118. The voice portal returns to the regular call process 1108 in step 1119, if the user chooses to return to the main menu. Otherwise, the voice portal prompts the user to choose a type of news in step 1115.

If the user did not choose extra news in step 1123, the voice portal determines whether the user chose business news in step 1126. If the user chose business news, the voice portal retrieves business news in step 1127 and plays it back to the user. After playing the business news to the user, the voice portal prompts the user if he or she would like to return to the main menu in step 1118. The voice portal returns to the regular call process 1108 in step 1119, if the user chooses to return to the main menu. Otherwise, the voice portal prompts the user to choose a type of news in step 1115. One skilled in the art should recognize that further functionality could be added to business news, such that the user could retrieve specialized stock quotes, economic news, and company specific news, among others.

Figure 11D:
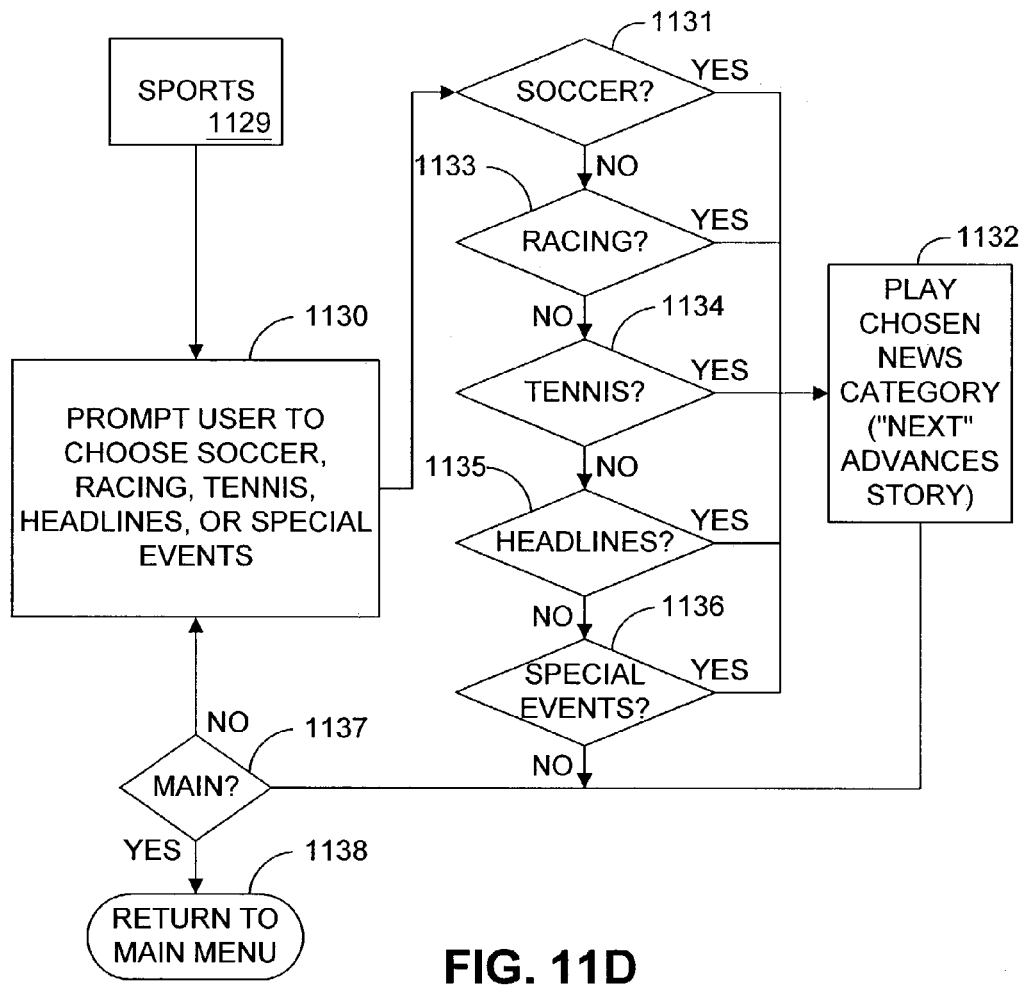
FIG. 11D is an embodiment, among others, of a flowchart for sports content used by the system of FIG. 1 to interact with voice callers.

Referring again to FIG. 11A, if the user did not select news, the voice portal determines if the user selected sports in step 1128. If the user selected sports, the voice portal retrieves the sports page 1129. Referring now to FIG. 11D, the voice portal prompts the user to choose a category of sports news in step 1130. The categories can include, among many others: soccer, racing, tennis, headlines, and special events, among others. The voice portal then determines if the user has selected soccer in step 1131. If the user selected soccer, the voice portal retrieves soccer news and plays the news to the user in step 1132. If the user selected racing, in accordance with step 1133, the voice portal retrieves racing news and replays it to the user in step 1132. If the user selected tennis, in accordance with step 1134, the voice portal retrieves tennis news and replays it to the user in step 1132. If the user selected headlines, in accordance with step 1135, the voice portal retrieves headlines and replays them to the user in step 1132. If the user selected special events, in accordance with step 1136, the voice portal retrieves special event news and replays it to the user in step 1132. After playing news to the user in step 1132, or sensing that the user has not made a selection in step 1130, the voice portal prompts the user to choose whether or not to return to the main menu in step 1137. If the user wishes to return to the main menu, the voice portal will return to the regular call process 1138. If the user wishes to stay in the sports news section, the voice portal returns to step 1130, and prompts the user to select a type of sports news.

Figure 11E:
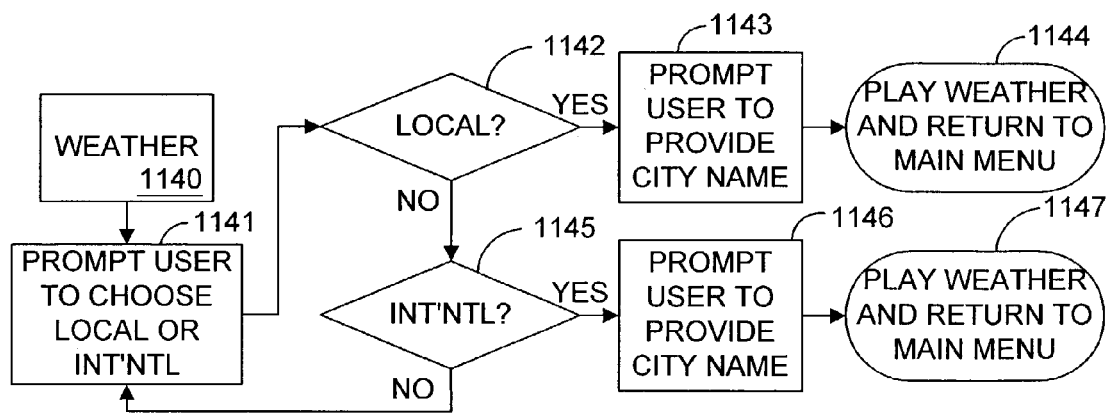
FIG. 11E is an embodiment, among others, of a flowchart for weather content used by the system of FIG. 1 to interact with voice callers.

Returning to FIG. 11A, if the user did not select sports, the voice portal determines if the user selected weather in step 1139. If the user selected weather, the voice portal retrieves the weather page 1140. Referring now to FIG. 11E, the voice portal prompts the user to choose local or international weather, as shown in step 1141. If the user chooses local weather, in step 1142, the voice portal prompts the user to provide a city name. There are several ways that the user could input the city. A speech recognition system could be used to match the city named to a plethora of existing cities. Alternatively, the user could be provided a list of cities from which to choose, or could enter the city by typing it into the phone using the letters associated with each of the numbers. The voice portal could then retrieve a weather report corresponding to the selected city and play the report to the user in step 1144. If the user chose international weather in step 1145, the user would be prompted to select a city in step 1146. This could be done by any of the methods outlined above, or by using another method. The voice portal would then retrieve the weather corresponding to the selected city and play the weather to the user. One skilled in the art should recognize that in some embodiments, among others, the carrier could use the location determination system 214 to locate the user and provide local weather without prompting the user to select a city for weather.

Figure 11F:
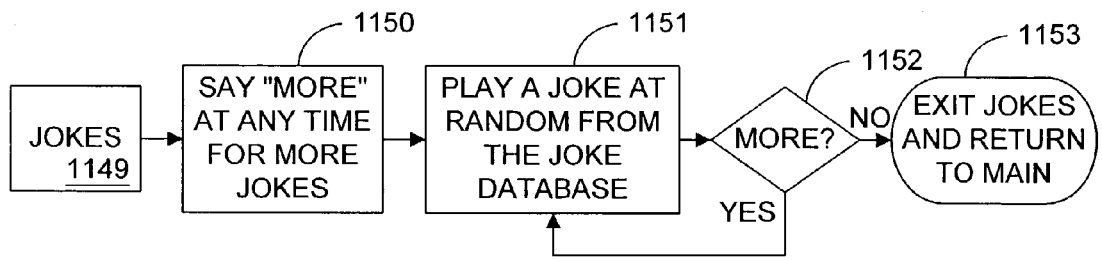
FIG. 11F is an embodiment, among others, of a flowchart for joke content used by the system of FIG. 1 to interact with voice callers.

Returning to FIG. 11A, if the user did not select weather, the voice portal determines if the user selected jokes in step 1148. If the user selected jokes, the voice portal retrieves the jokes page 1149. Referring now to FIG. 11F, in step 1150, the voice portal alerts the user that he or she may say "more" at any time to hear more jokes. In step 1151, the voice portal retrieves a random joke from a joke database provided by the content provider. In step 1152, the voice portal prompts the user to determine whether another joke should be played. If so, the voice portal returns to step 1151. If not, the voice portal returns to the regular call process 1108 in step 1153.

Figure 11G:
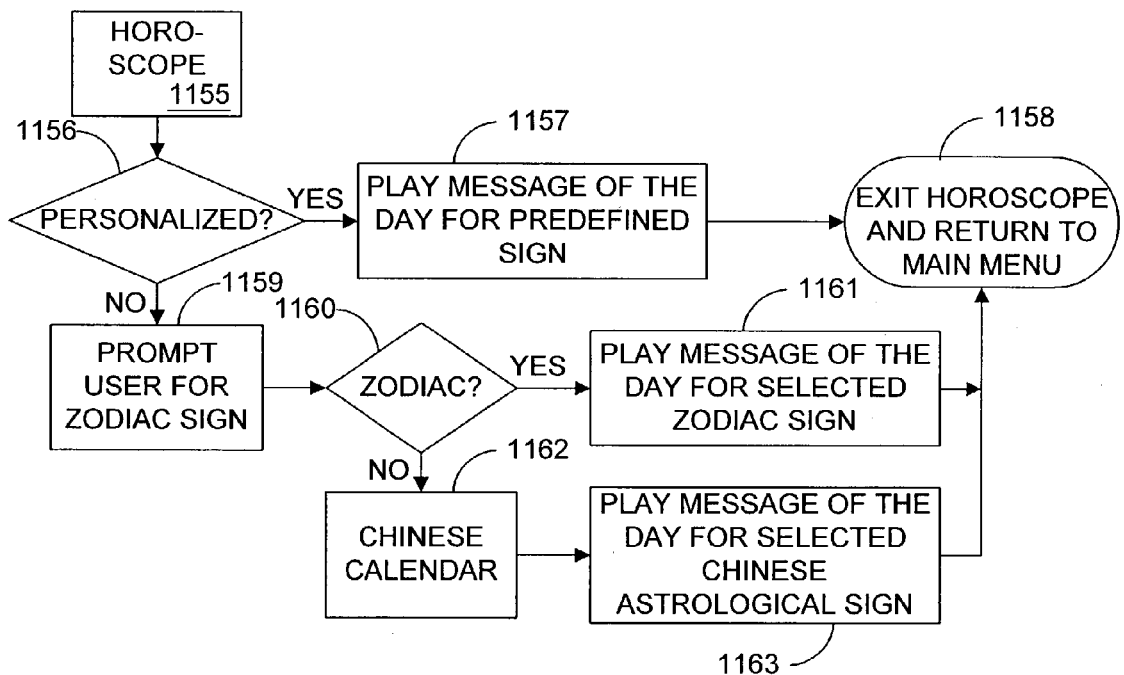
FIG. 11G is an embodiment, among others, of a flowchart for horoscope content used by the system of FIG. 1 to interact with voice callers.

Referring again to FIG. 11A, if the user did not select jokes, the voice portal determines if the user selected horoscope in step 1154. If the user selected horoscope, the voice portal retrieves the horoscope page 1140. Referring now to FIG. 11G, in step 1156 the voice portal determines whether the user has set a personalized horoscope sign. If the user has personalized his or her horoscope sign, the voice portal retrieves the message of the day associated with the predetermined sign and plays the message in step 1157. In step 1158, the voice portal exits the horoscope and returns to the main menu at the regular call process 1108. If there is no predetermined sign, the voice portal prompts the user for a sign in step 1159. If the sign is a zodiac sign, according to step 1160, the voice portal retrieves the zodiac sign and replays the message of the day for the selected zodiac sign in step 1161. The voice portal then returns to the main menu page according to step 1158. If the sign is from the Chinese calendar, in accordance with step 1162, the voice portal retrieves the message of the day for the selected Chinese astrological sign in step 1163, and returns to the main menu in step 1158.

Figure 11H:
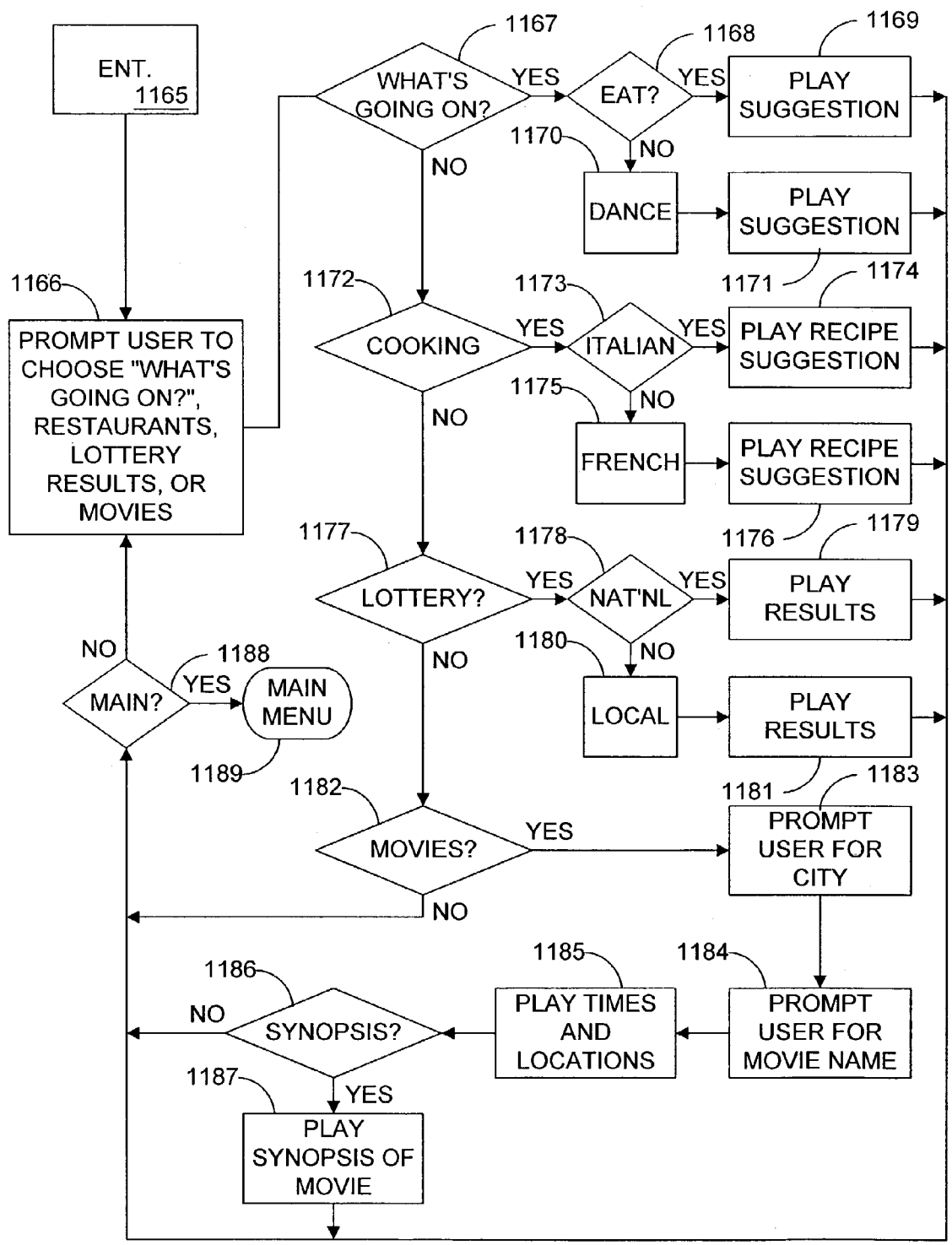
FIG. 11H is an embodiment, among others, of a flowchart for entertainment content used by the system of FIG. 1 to interact with voice callers.

Referring again to FIG. 11A, if the user did not select horoscope, the voice portal determines if the user selected entertainment in step 1164. If the user selected entertainment, the voice portal retrieves the entertainment page 1165. Referring now to FIG. 11H, in step 1166 the voice portal prompts the user to select the type of entertainment information he or she would like to receive. The user can select from multiple categories that can include, among many others: "What's going on?", cooking, lottery, and movies. If the user selects "What's going on?", the voice portal will prompt the user as to the type of activity about which the user wishes to know. For example the user could be interested in eating. If the user is interested in eating, as shown in step 1168, the voice portal retrieves suggestions and plays them for the user in step 1169. If the user is interested in dancing, as shown in step 1170, the voice portal can retrieve a list of dance clubs and play the list for the user in step 1171. One skilled in the art should recognize that these are mere example of things that could be included in the "What's going on?" category.

If the user selected cooking in step 1172, the voice portal could prompt the user to choose a style of cooking, such as, for example, Italian or French. If the user wishes to receive an Italian recipe, as shown in step 1173, the voice portal can retrieve an Italian recipe and play the suggestion for the user in step 1174. However, if the user selects to receive a French recipe, as shown in step 1175, the voice portal could retrieve a French recipe and play the suggestion for the user in step 1176. One skilled in the art should recognize that a plethora of styles of cooking exist that could be provided for the user to choose.

If the user selected the lottery in step 1177, the voice portal could prompt the user to choose which lottery results are desired. In this example, national and local lottery results are provided. If the user selects national results, as shown in step 1178, the voice portal will retrieve the national lottery results and play them back for the user in step 1179. On the other hand, if the user selects local results, as shown in step 1180, the voice portal retrieves the results and plays them back for the user in step 1181.

If the user selected movies in step 1182, the voice portal would prompt the user to select a city in which the movie is playing in step 1183. The voice portal then prompts the user for the name of the movie that the user would like to see in step 1184. The voice portal would then retrieve movie information and play the movie times and locations back to the user in step 1185. In step 1186, the voice portal could prompt the user to determine whether or not the user wishes to hear a synopsis of the movie. If the user wishes to hear a synopsis of the movie, in step 1187 the voice portal plays a movie synopsis or trailer. After playing the synopsis, or being selected not to play the synopsis, in step 1188 the voice portal prompts the user to determine if the user would like to return to the main menu. If the user wishes to return to the main menu, in step 1189, the voice portal returns to the regular call process 1108. Otherwise, the voice portal returns to step 1166, and prompts the user to choose a type of entertainment.

Figure 11I:
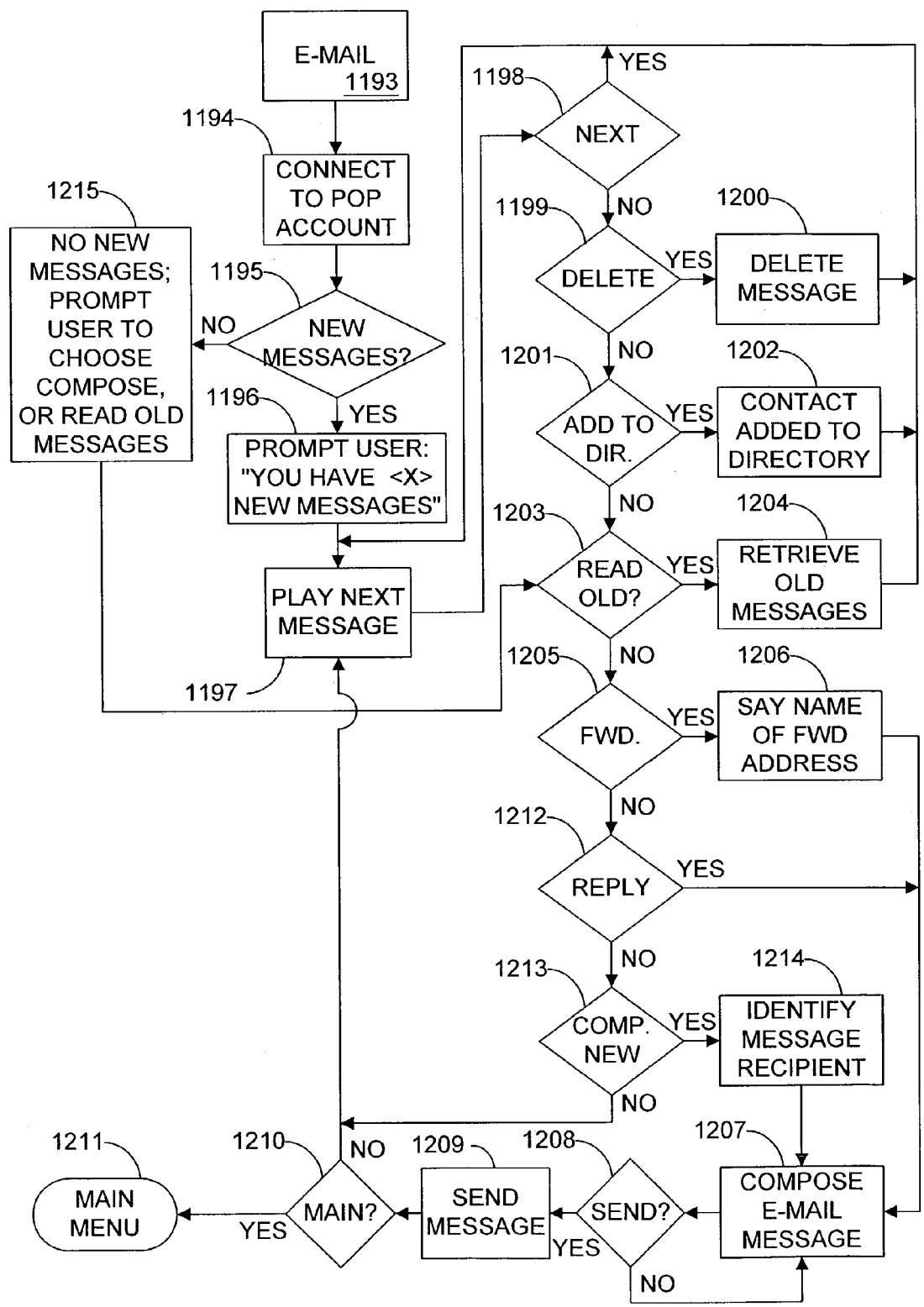
FIG. 11I is an embodiment, among others, of a flowchart for e-mail content used by the system of FIG. 1 to interact with voice callers.
Figure 11J:
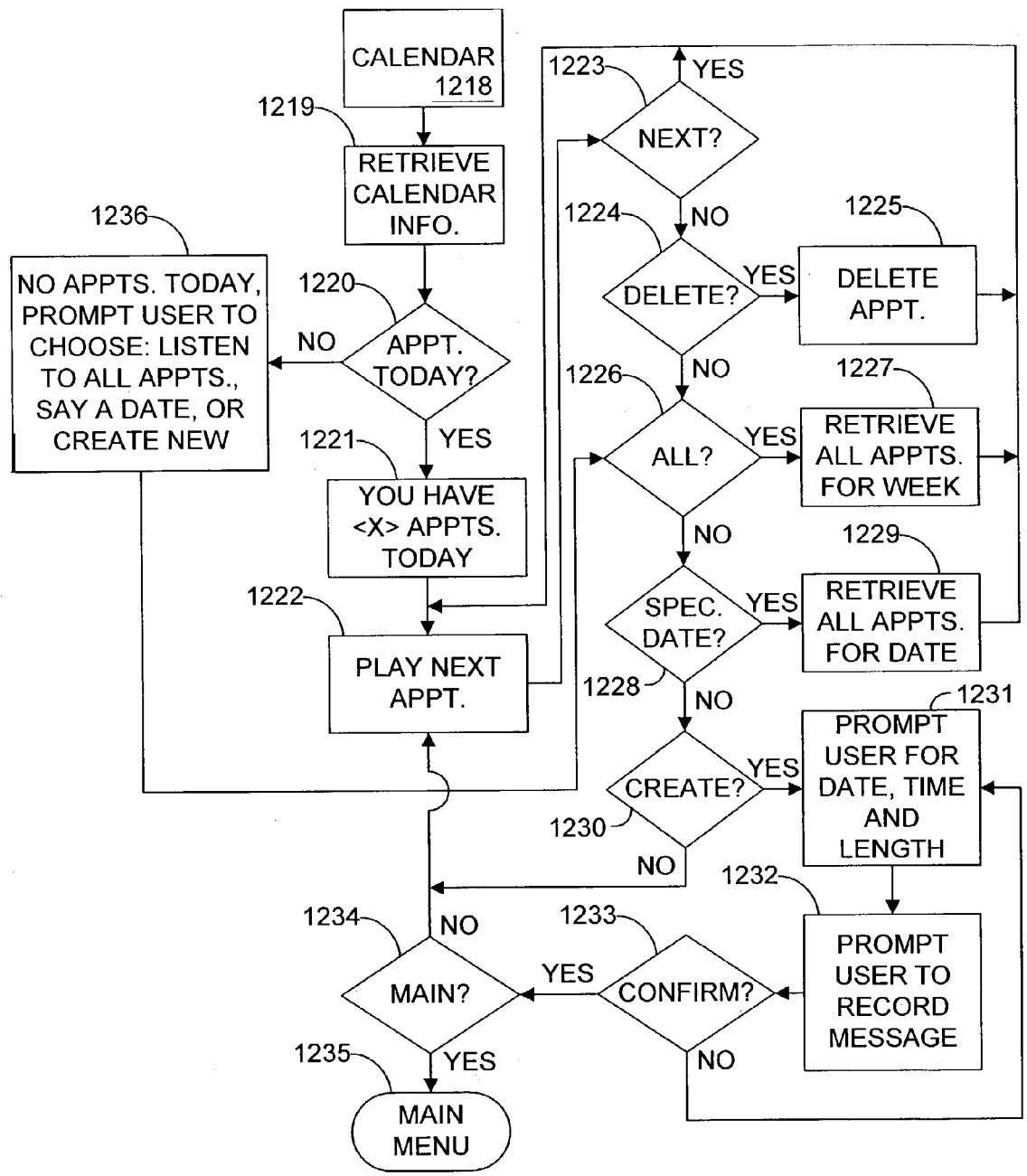
FIG. 11J is an embodiment, among others, of a flowchart for calendar content used by the system of FIG. 1 to interact with voice callers.

Referring again to FIG. 11A, if the user did not select entertainment, the voice portal determines if the user selected e-mail in step 1190. If the user selected e-mail, the voice portal determines whether or not the user is registered to retrieve e-mail in step 1191. If the user is not registered, the voice portal alerts the user that registration is required in step 1192, and returns to step 1112. If the user is registered, the voice portal retrieves the e-mail page 1193. Referring now to FIG. 11I, the voice portal connects to a post office protocol (POP) server and retrieves new e-mail messages associated with the user's account from the POP server in step 1194. In step 1195, the voice portal determines whether new messages were received. If new messages were received, the voice portal alerts the user as to the number of new messages received in step 1196. In step 1197, the voice portal plays the next message using TTL functionality.

The voice portal then prompts the user as to several options the user has with respect to the current e-mail message. In step 1198, the voice portal determines whether the user has decided to skip the current message. If the user decides to skip the message, the voice portal returns to step 1197 and plays the next message. In step 1199, the voice portal determines whether the user has decided to delete the current message. If the user decides to delete the current message, the voice portal will delete the message in step 1200, and return to step 1097 to play the next message. In step 1201, the voice portal determines whether or not the user wishes to add the sender of the current message to his or her directory. If the user wishes to add the sender to his or her directory, the voice portal will add the sender in step 1202, and return to step 1097 to play the next message. In step 1203, the voice portal determines whether or not the user wishes to replay old messages. If the user wishes to replay old messages, the voice portal will retrieve old messages in step 1204 and return to step 1097 to play the old messages.

In step 1205, the voice portal determines whether or not the user wishes to forward the current message to another user. If the user wishes to forward the current message to another user, the voice portal will prompt the user for the name of the forwarding address in step 1206. The voice portal will then prompt the user to record the e-mail message in step 1207. In step 1208, the voice portal confirms sending the message with the user. If the user wishes to rewrite the message, the voice portal will return to step 1207. If the user confirms sending the message, the voice portal sends the message to the e-mail server in step 1209. The voice portal can then determine whether or not the user wishes to return to the main menu in step 1210. If the user wishes to return to the main menu, in step 1211 the voice portal returns to the regular call process 1008. Otherwise, the voice portal returns to step 1097 to play another message.

In step 1212, the voice portal determines whether or not the user wishes to reply to the current message. If the user wishes to reply to the current message, the voice portal will prompt the user to record a message in step 1207, confirm sending in step 1208, and send the message in step 1209. If the voice portal determines that the user wishes to compose a new message in step 1213, the voice portal will prompt the user to identify the recipient in step 1214. The voice portal will then allow the user to compose the message in step 1207, confirm sending in step 1208, and send in step 1209.

If there were no new messages retrieved in step 1095, the voice portal prompts the user to choose to compose a new message or read old messages. One skilled in the art should understand that each of these functions operates similarly whether new messages were retrieved from the POP server or not.

Referring again to FIG. 10A, if the user did not select e-mail, the voice portal determines if the user selected the calendar in step 1216. If the user selected the calendar, the voice portal determines whether or not the user is registered to retrieve the calendar in step 1217. If the user is not registered, the voice portal alerts the user that registration is required in step 1092, and returns to step 1012. If the user is registered, the voice portal retrieves the calendar page 1218.

The voice portal, in step 1219, retrieves the calendar information associated with the user. The calendar then determines whether or not the user has an appointment scheduled for the current day in step 1220. If the user has an appointment scheduled for the current day, the voice portal alerts the user that he or she has <x> number of appointments today in step 1221. The voice portal then plays the next appointment listed on the schedule in step 1222. The user can then decide to skip to the next appointment listing in step 1223. If the user skips to the next appointment listing, the voice portal returns to step 1222 and retrieves the next appointment. If the user decides to delete the current appointment, as shown in step 1224, the voice portal will delete the appointment in accordance with step 1225.

The voice portal determines in step 1226 whether or not the user wishes to retrieve all appointments from the calendar for the next week. If the user wishes to retrieve all appointments for the next week, the voice portal will retrieve the appointments in step 1227, and return to step 1222 to play the next appointment. If the user wishes to retrieve appointments for a specific date, as shown in step 1228, the voice portal will retrieve all appointments for that date in step 1229, and return to step 1222 to play the appointments.

If the user wishes to create an appointment, in step 1230, the voice portal will prompt the user for a date, time and length of the appointment in step 1231. The voice portal will also prompt the user to record a message associated with the appointment in step 1232. Upon recording the date, time, length and message, the voice portal can confirm the addition of the appointment to the calendar in step 1233. If the user does not confirm the appointment, the voice portal returns to step 1231 to create the appointment anew. Otherwise, the appointment is created and the voice portal prompts the user to determine whether or not to return to the main menu in step 1234. If the user wishes to return to the main menu, in step 1235 the voice portal will return to the regular call process 1008. Otherwise, the voice portal retrieves the next appointment and plays the appointment to the user.

If there are no appointments found for the current day in step 1220, the voice portal will prompt the user to decide if he or she would like to listen to all appointments for the next week, check a specific date, or create a new appointment in step 1236. One skilled in the art should understand that these steps are the same regardless of whether any appointments were found for the current day in step 1220.

One skilled in the art should understand that the voice portal content received by the user could be customized through the web interface. Moreover, in alternative embodiments, among others, the user could be allowed to customize the content sent to the voice portal through a personalization menu at the voice portal.

Process and function descriptions and blocks in flow charts can be understood as representing, in some embodiments, modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention. In addition, such functional elements can be implemented as logic embodied in hardware, software, firmware, or a combination thereof, among others. In some embodiments involving software implementations, such software comprises an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any means that can contain, store, communicate, propagate, or transport the software for use by or in connection with the instruction execution system, apparatus, or device.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included herein within the scope of this disclosure and the present invention and protected by the following claims.

What is claimed is:

1. A system for interfacing with a customer of a telecommunication carrier, comprising:
a wireless internet server operable to route internet content from a content provider to a plurality of wireless platform gateways corresponding to different messaging formats of wireless platforms that are used to access the gateways; and
a wireless market place system operable to receive a set of rules from a third party vendor, the rules including at least one designation for delivering content to customers of a particular wireless platform that is being used to access the wireless internet server, wherein the wireless internet server formats content from the third party vendor in accordance with a messaging format of the particular wireless platform being used to access the wireless internet server and delivers the content to the customers in accordance with the set of rules from the third party vendor and the messaging format of the respective wireless platform utilized by the customers to access the wireless internet server, the wireless internet server accessible by the plurality of wireless platforms.

2. The system of claim 1, wherein the plurality of wireless platform gateways are operable to deliver a message to a wireless device.

3. The system of claim 1, wherein the wireless market place system generates a text message to be routed through the wireless internet server to a short message service center to a wireless device.

4. The system of claim 1, wherein wireless market place system generates a message to be routed through the wireless internet server to a voice portal and communicated to a wireless device.

5. The system of claim 1, wherein the wireless market place system generates a wireless markup language file to be routed through the wireless internet server to a wireless access protocol gateway to a wireless device.

6. The system of claim 1, wherein the wireless market place system generates a hypertext or extensible markup language file to be routed through a proxy server to a computer using the telecommunications carrier as an internet service provider.

7. The system of claim 1, wherein the wireless internet server operable to check a customer profile associated with the customer before routing a message from the wireless market place system.

8. The system of claim 7, wherein the wireless internet server is operable to reject the message from the wireless market place system if the customer profile indicates that the customer does not want to receive solicitation.

9. The system of claim 1, wherein the wireless internet server is operable to authenticate the customer through a centralized mobile authentication registration system.

10. The system of claim 9, wherein the wireless internet server is operable to provide a customer with a plurality of personalized internet content upon authenticating the customer.

11. The system of claim 10, wherein the mobile authentication system is operable to provide the customer with a plurality of internet applications via the wireless internet server.

12. The system of claim 11, wherein the mobile authentication registration system is coupled to a content hub which is operable to provide the plurality of internet content.

13. A method of providing access to a plurality of customers, the method comprising the steps of:

receiving a message from a third party vendor;

formatting the message for delivery to a recipient according to a messaging format of a wireless platform being used by the recipient to access a wireless internet server, wherein the wireless internet server is accessible by a plurality of wireless platforms; and sending the message to at least one of the plurality of customers in accordance with a set of rules from the third party vendor, the rules including at least one designation for delivering content to customers of a particular wireless platform that is currently being used to access the wireless internet server.

14. The method of claim 13, wherein sending the message to at least one of the plurality of customers comprises the steps of:

sending the message to the wireless internet server;

sending the message to the appropriate gateway; and sending the message to a wireless device associated with said at least one of the plurality of customers in a messaging format that was used to access the wireless internet server.

15. The method of claim 14, wherein the wireless internet server sends the message to a wireless access protocol gateway and the wireless device is a wireless access protocol enabled phone.

16. The method of claim 14, wherein the wireless internet server sends the message to a short message service center and the wireless device is an short message service enabled phone.

17. The method of claim 14, wherein the wireless internet server sends the message to a voice portal.

18. The method of claim 14, wherein the wireless internet server sends the message to a proxy server and the wireless device is a computer with a high speed wireless internet connection.

19. The method of claim 14, wherein the message is an advertisement from the third party vendor.

20. The method of claim 14, wherein the message is internet content from the third party vendor.

* * * * *